United States Patent
Lei et al.

(10) Patent No.: US 11,297,645 B2
(45) Date of Patent: Apr. 5, 2022

(54) HANDLING CONFLICTS BETWEEN DYNAMIC SCHEDULING AND RANDOM ACCESS RESOURCES

(71) Applicant: QUALCOMM Incorporated, San Diego, CA (US)

(72) Inventors: Jing Lei, San Diego, CA (US); Wanshi Chen, San Diego, CA (US); Linhai He, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 7 days.

(21) Appl. No.: 17/031,537

(22) Filed: Sep. 24, 2020

(65) Prior Publication Data

US 2021/0100029 A1    Apr. 1, 2021

Related U.S. Application Data

(60) Provisional application No. 62/907,220, filed on Sep. 27, 2019.

(51) Int. Cl.
*H04W 74/00* (2009.01)
*H04W 76/27* (2018.01)
(Continued)

(52) U.S. Cl.
CPC ..... *H04W 74/008* (2013.01); *H04W 72/0446* (2013.01); *H04W 72/14* (2013.01); *H04W 74/0841* (2013.01); *H04W 76/27* (2018.02)

(58) Field of Classification Search
CPC ......... H04W 72/0446; H04W 72/1242; H04W 72/1289; H04W 72/14; H04W 74/006;
(Continued)

(56) References Cited

U.S. PATENT DOCUMENTS 10,827,528 B2 * 11/2020 Mukherjee ............ H04W 16/14
2013/0242730 A1    9/2013 Pelletier et al.
(Continued)

FOREIGN PATENT DOCUMENTS

WO    WO-2019033027 A1    2/2019
WO    WO-2019099443 A1    5/2019

OTHER PUBLICATIONS

Partial International Search Report—PCT/US2020/052679—ISA/EPO—dated Nov. 26, 2020.
(Continued)

*Primary Examiner* — Kashif Siddiqui
(74) *Attorney, Agent, or Firm* — Holland & Hart LLP

(57) ABSTRACT

Methods, systems, and devices for wireless communications are described. In some systems, a user equipment (UE) may perform a random access channel (RACH) procedure with a base station. The UE may receive a message configuring a RACH preamble occasion and an uplink data occasion. The message may be a radio resource control (RRC) message or a system information (SI) message. In some cases, the UE may determine if the RACH preamble occasion, the uplink data occasion, or both are restricted for cancellation based on the message. The UE may determine when to monitor a downlink control channel for dynamic scheduling based on determining which occasions are restricted for cancellation and may transmit a RACH message based on monitoring—or not monitoring—the downlink control channel for dynamic scheduling preempting a RACH occasion. In some other cases, a base station may schedule transmissions to not overlap with configured RACH occasions.

30 Claims, 20 Drawing Sheets

(51) Int. Cl.
*H04W 72/04* (2009.01)
*H04W 72/14* (2009.01)
*H04W 74/08* (2009.01)

(58) Field of Classification Search
CPC .......... H04W 74/008; H04W 74/0833; H04W 74/0841; H04W 76/27
See application file for complete search history.

(56) References Cited

U.S. PATENT DOCUMENTS

| | | | |
|---|---|---|---|
| 2014/0086112 A1* | 3/2014 | Stern-Berkowitz | H04L 1/1822 370/280 |
| 2015/0043446 A1* | 2/2015 | Tsirtsis | H04W 72/1242 370/329 |
| 2019/0149269 A1 | 5/2019 | Chatterjee et al. | |

OTHER PUBLICATIONS

International Search Report and Written Opinion—PCT/US2020/052679—ISA/EPO—dated Mar. 17, 2021.

\* cited by examiner

HANDLING CONFLICTS BETWEEN DYNAMIC SCHEDULING AND RANDOM ACCESS RESOURCES

CROSS REFERENCE

The present application for patent claims the benefit of U.S. Provisional Patent Application No. 62/907,220 by LEI et al., entitled "HANDLING CONFLICTS BETWEEN DYNAMIC SCHEDULING AND RANDOM ACCESS RESOURCES," filed Sep. 27, 2019, assigned to the assignee hereof, and expressly incorporated by reference herein.

BACKGROUND

The following relates generally to wireless communications, and more specifically to handling conflicts between dynamic scheduling and random access resources.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support handling conflicts between dynamic scheduling and random access resources. Generally, the described techniques provide for a user equipment (UE) to receive a message configuring a random access channel (RACH) preamble occasion and an uplink data occasion. The message may be, for instance, a radio resource control (RRC) message or a system information (SI) message. The UE may determine if the RACH preamble occasion, the uplink data occasion, or both are restricted for cancellation based on the message. The UE may determine when to monitor a downlink control channel based on determining which occasions are restricted for cancellation and may transmit a RACH message (e.g., a RACH Message 1 (Msg1), a RACH Message A (MsgA), etc.) based on determining when to monitor the downlink control channel.

A method for wireless communications at a UE is described. The method may include receiving a message configuring a resource allocation for at least a RACH preamble occasion and an uplink data occasion, determining if the RACH preamble occasion, the uplink data occasion, or both are restricted for cancellation based on the message, determining when to monitor a downlink control channel based on the determining if the RACH preamble occasion, the uplink data occasion, or both are restricted for cancellation, and transmitting a RACH message in the RACH preamble occasion, the uplink data occasion, or both based on the determining when to monitor the downlink control channel.

An apparatus for wireless communications at a UE is described. The apparatus may include a processor, memory in electronic communication with the processor, and instructions stored in the memory. The instructions may be executable by the processor to cause the apparatus to receive a message configuring a resource allocation for at least a RACH preamble occasion and an uplink data occasion, determine if the RACH preamble occasion, the uplink data occasion, or both are restricted for cancellation based on the message, determine when to monitor a downlink control channel based on the determining if the RACH preamble occasion, the uplink data occasion, or both are restricted for cancellation, and transmit a RACH message in the RACH preamble occasion, the uplink data occasion, or both based on the determining when to monitor the downlink control channel.

Another apparatus for wireless communications at a UE is described. The apparatus may include means for receiving a message configuring a resource allocation for at least a RACH preamble occasion and an uplink data occasion, means for determining if the RACH preamble occasion, the uplink data occasion, or both are restricted for cancellation based on the message, means for determining when to monitor a downlink control channel based on the determining if the RACH preamble occasion, the uplink data occasion, or both are restricted for cancellation, and means for transmitting a RACH message in the RACH preamble occasion, the uplink data occasion, or both based on the determining when to monitor the downlink control channel.

A non-transitory computer-readable medium storing code for wireless communications at a UE is described. The code may include instructions executable by a processor to receive a message configuring a resource allocation for at least a RACH preamble occasion and an uplink data occasion, determine if the RACH preamble occasion, the uplink data occasion, or both are restricted for cancellation based on the message, determine when to monitor a downlink control channel based on the determining if the RACH preamble occasion, the uplink data occasion, or both are restricted for cancellation, and transmit a RACH message in the RACH preamble occasion, the uplink data occasion, or both based on the determining when to monitor the downlink control channel.

In some examples of the method, apparatuses, and non-transitory computer-readable medium described herein, the message may be a system information (SI) message and the message may configure the resource allocation for contention-based random access (CBRA).

In some examples of the method, apparatuses, and non-transitory computer-readable medium described herein, determining if the RACH preamble occasion, the uplink data occasion, or both are restricted for cancellation may include operations, features, means, or instructions for determining that the RACH preamble occasion and the uplink data occasion are both restricted for cancellation based on the SI message.

In some examples of the method, apparatuses, and non-transitory computer-readable medium described herein, the message may be an RRC message and the message may configure the resource allocation for contention-free random access (CFRA).

In some examples of the method, apparatuses, and non-transitory computer-readable medium described herein, determining if the RACH preamble occasion, the uplink data occasion, or both are restricted for cancellation may include operations, features, means, or instructions for determining if the RACH preamble occasion, the uplink data occasion, or both are restricted for cancellation based on a first indicator for RACH preamble occasion restriction and a second indicator for uplink data occasion restriction for the RRC message.

In some examples of the method, apparatuses, and non-transitory computer-readable medium described herein, the first indicator, the second indicator, or both may include one-bit or multi-bit flags.

In some examples of the method, apparatuses, and non-transitory computer-readable medium described herein, the transmitting may include operations, features, means, or instructions for transmitting, in the RACH preamble occasion, a RACH preamble message and refraining from transmitting, in the uplink data occasion, an uplink data message based on the determining if the RACH preamble occasion, the uplink data occasion, or both are restricted for cancellation.

In some examples of the method, apparatuses, and non-transitory computer-readable medium described herein, the determining if the RACH preamble occasion, the uplink data occasion, or both are restricted for cancellation includes determining that the RACH preamble occasion and the uplink data occasion are both restricted for cancellation, and the determining when to monitor the downlink control channel includes determining to refrain from monitoring the downlink control channel for dynamic scheduling preempting the RACH preamble occasion, the uplink data occasion, or both based on the RACH preamble occasion and the uplink data occasion both being restricted for cancellation.

In some examples of the method, apparatuses, and non-transitory computer-readable medium described herein, the determining if the RACH preamble occasion, the uplink data occasion, or both are restricted for cancellation includes determining that the RACH preamble occasion is restricted for cancellation, and the transmitting includes transmitting, in the RACH preamble occasion, a RACH Msg1 in a four-step RACH procedure, where the determining when to monitor the downlink control channel includes determining to refrain from monitoring the downlink control channel for dynamic scheduling preempting the RACH preamble occasion, the uplink data occasion, or both based on the RACH preamble occasion being restricted for cancellation and the transmitting the RACH Msg1.

In some examples of the method, apparatuses, and non-transitory computer-readable medium described herein, the determining if the RACH preamble occasion, the uplink data occasion, or both are restricted for cancellation includes determining that the RACH preamble occasion is restricted for cancellation and the uplink data occasion is non-restricted for cancellation, and the determining when to monitor the downlink control channel includes determining to monitor the downlink control channel for dynamic scheduling preempting the uplink data occasion based on the uplink data occasion being non-restricted for cancellation.

Some examples of the method, apparatuses, and non-transitory computer-readable medium described herein may further include operations, features, means, or instructions for monitoring the downlink control channel for the dynamic scheduling of a dynamic slot format indication (SFI), a dynamic grant, or both preempting the uplink data occasion, where the downlink control channel corresponds to a common search space or a UE-specific search space and the transmitting may be based on the monitoring.

Some examples of the method, apparatuses, and non-transitory computer-readable medium described herein may further include operations, features, means, or instructions for receiving the dynamic SFI, the dynamic grant, or both preempting the uplink data occasion based on the monitoring, where the transmitting may include operations, features, means, or instructions for transmitting, in the RACH preamble occasion, a RACH preamble message and refraining from transmitting, in the uplink data occasion, an uplink data message based on the receiving.

In some examples of the method, apparatuses, and non-transitory computer-readable medium described herein, the RACH message may be a RACH MsgA in a two-step RACH procedure and the transmitting may include operations, features, means, or instructions for transmitting, in the RACH preamble occasion, a RACH preamble for the RACH MsgA and transmitting, in the uplink data occasion, an uplink data payload for the RACH MsgA based on the monitoring.

In some examples of the method, apparatuses, and non-transitory computer-readable medium described herein, the downlink control channel may be monitored up to a threshold time preceding the uplink data occasion by a dynamic scheduling processing threshold duration, where the dynamic scheduling processing threshold duration may be based on one or more UE capabilities, a frequency band of operation, a numerology of an active bandwidth part for downlink, uplink, or both, whether a bandwidth part switch is involved, or a combination thereof.

In some examples of the method, apparatuses, and non-transitory computer-readable medium described herein, the determining if the RACH preamble occasion, the uplink data occasion, or both are restricted for cancellation includes determining that the RACH preamble occasion is non-restricted for cancellation, and the determining when to monitor the downlink control channel includes determining to monitor the downlink control channel for dynamic scheduling preempting the RACH preamble occasion, the uplink data occasion, or both based on the RACH preamble occasion being non-restricted for cancellation.

Some examples of the method, apparatuses, and non-transitory computer-readable medium described herein may further include operations, features, means, or instructions for monitoring the downlink control channel for the dynamic scheduling of a dynamic SFI, a dynamic grant, or both preempting the RACH preamble occasion, the uplink data occasion, or both, where the downlink control channel corresponds to a common search space or a UE-specific search space and the transmitting may be based on the monitoring.

Some examples of the method, apparatuses, and non-transitory computer-readable medium described herein may further include operations, features, means, or instructions for receiving the dynamic SFI, the dynamic grant, or both preempting the RACH preamble occasion based on the monitoring, where the transmitting may include operations, features, means, or instructions for refraining from transmitting the RACH message in the RACH preamble occasion and the uplink data occasion based on the receiving and transmitting the RACH message in a subsequent RACH preamble occasion, a subsequent uplink data occasion, or both based on the receiving.

In some examples of the method, apparatuses, and non-transitory computer-readable medium described herein, the determining if the RACH preamble occasion, the uplink data occasion, or both are restricted for cancellation further includes determining that the uplink data occasion is non-restricted for cancellation. Some examples of the method, apparatuses, and non-transitory computer-readable medium described herein may further include operations, features, means, or instructions for receiving the dynamic SFI, the dynamic grant, or both preempting the uplink data occasion based on the monitoring, where the transmitting may include operations, features, means, or instructions for transmitting, in the RACH preamble occasion, a RACH preamble message based on the monitoring and refraining from transmitting, in the uplink data occasion, an uplink data message based on the receiving.

In some examples of the method, apparatuses, and non-transitory computer-readable medium described herein, the RACH message may be a RACH MsgA in a two-step RACH procedure and the transmitting may include operations, features, means, or instructions for transmitting, in the RACH preamble occasion, a RACH preamble for the RACH MsgA based on the monitoring and transmitting, in the uplink data occasion, an uplink data payload for the RACH MsgA based on the monitoring.

In some examples of the method, apparatuses, and non-transitory computer-readable medium described herein, the downlink control channel may be monitored up to a threshold time preceding the RACH preamble occasion by a dynamic scheduling processing threshold duration, where the dynamic scheduling processing threshold duration may be based on one or more UE capabilities, a frequency band of operation, a numerology of an active bandwidth part for downlink, uplink, or both, whether a bandwidth part switch is involved, or a combination thereof.

In some examples of the method, apparatuses, and non-transitory computer-readable medium described herein, receiving the message configuring the RACH preamble occasion and the uplink data occasion may include operations, features, means, or instructions for receiving an SI message, an RRC message, or both configuring a set of RACH preamble occasions and a set of uplink data occasions for a configuration period.

Some examples of the method, apparatuses, and non-transitory computer-readable medium described herein may further include operations, features, means, or instructions for selecting the RACH preamble occasion from the set of RACH preamble occasions and the uplink data occasion from the set of uplink data occasions.

Some examples of the method, apparatuses, and non-transitory computer-readable medium described herein may further include operations, features, means, or instructions for selecting a set of RACH preamble occasion and uplink data occasion candidate pairs from the set of RACH preamble occasions and the set of uplink data occasions, identifying dynamic scheduling preempting a respective RACH preamble occasion, a respective uplink data occasion, or both for a subset of the set of RACH preamble occasion and uplink data occasion candidate pairs, and removing the subset of the set of RACH preamble occasion and uplink data occasion candidate pairs from the set of RACH preamble occasion and uplink data occasion candidate pairs, where the RACH message is transmitted in the RACH preamble occasion, the uplink data occasion, or both for a RACH preamble occasion and uplink data occasion candidate pair remaining in the set of RACH preamble occasion and uplink data occasion candidate pairs following the removing.

In some examples of the method, apparatuses, and non-transitory computer-readable medium described herein, the selecting may be based on one or more reference signal received power (RSRP) measurements, one or more link level qualities, one or more UE capabilities, or a combination thereof.

Some examples of the method, apparatuses, and non-transitory computer-readable medium described herein may further include operations, features, means, or instructions for receiving a configuration message indicating a set of RACH occasion configurations, where each RACH occasion configuration of the set of RACH occasion configurations corresponds to a capability of the UE to handle dynamic scheduling and selecting a RACH occasion configuration of the set of RACH occasion configurations based on the capability of the UE to handle the dynamic scheduling, where the message may be received based on the selected RACH occasion configuration.

A method for wireless communications at a base station is described. The method may include determining a RACH preamble occasion and an uplink data occasion for a RACH message transmission by a UE, generating an RRC message to indicate the RACH preamble occasion and the uplink data occasion, where the RRC message includes a first indicator indicating whether the RACH preamble occasion is restricted for cancellation and a second indicator indicating whether the uplink data occasion is restricted for cancellation, and transmitting, to the UE, the generated RRC message.

An apparatus for wireless communications at a base station is described. The apparatus may include a processor, memory in electronic communication with the processor, and instructions stored in the memory. The instructions may be executable by the processor to cause the apparatus to determine a RACH preamble occasion and an uplink data occasion for a RACH message transmission by a UE, generate an RRC message to indicate the RACH preamble occasion and the uplink data occasion, where the RRC message includes a first indicator indicating whether the RACH preamble occasion is restricted for cancellation and a second indicator indicating whether the uplink data occasion is restricted for cancellation, and transmit, to the UE, the generated RRC message.

Another apparatus for wireless communications at a base station is described. The apparatus may include means for determining a RACH preamble occasion and an uplink data occasion for a RACH message transmission by a UE, means for generating an RRC message to indicate the RACH preamble occasion and the uplink data occasion, where the RRC message includes a first indicator indicating whether the RACH preamble occasion is restricted for cancellation and a second indicator indicating whether the uplink data occasion is restricted for cancellation, and means for transmitting, to the UE, the generated RRC message.

A non-transitory computer-readable medium storing code for wireless communications at a base station is described. The code may include instructions executable by a processor to determine a RACH preamble occasion and an uplink data occasion for a RACH message transmission by a UE, generate an RRC message to indicate the RACH preamble occasion and the uplink data occasion, where the RRC message includes a first indicator indicating whether the RACH preamble occasion is restricted for cancellation and a second indicator indicating whether the uplink data occasion is restricted for cancellation, and transmit, to the UE, the generated RRC message.

In some examples of the method, apparatuses, and non-transitory computer-readable medium described herein, the first indicator indicates that the RACH preamble occasion is restricted for cancellation.

Some examples of the method, apparatuses, and non-transitory computer-readable medium described herein may further include operations, features, means, or instructions for assigning one or more CFRA preamble sequences to the RACH preamble occasion, where the RACH preamble occasion is restricted for cancellation based on the assigned one or more CFRA preamble sequences.

Some examples of the method, apparatuses, and non-transitory computer-readable medium described herein may further include operations, features, means, or instructions for dynamically scheduling a resource for a downlink or uplink message corresponding to a first priority value greater than a second priority value for the RACH message transmission by the UE, where the resource may be scheduled based on the RACH preamble occasion to avoid a scheduling conflict between the resource and the RACH preamble occasion.

In some examples of the method, apparatuses, and non-transitory computer-readable medium described herein, the second indicator indicates that the uplink data occasion is restricted for cancellation.

Some examples of the method, apparatuses, and non-transitory computer-readable medium described herein may further include operations, features, means, or instructions for dynamically scheduling a resource for a downlink or uplink message corresponding to a first priority value greater than a second priority value for the RACH message transmission by the UE, where the resource may be scheduled based on the uplink data occasion to avoid a scheduling conflict between the resource and the uplink data occasion.

In some examples of the method, apparatuses, and non-transitory computer-readable medium described herein, the first indicator indicates that the RACH preamble occasion is non-restricted for cancellation. Some examples of the method, apparatuses, and non-transitory computer-readable medium described herein may further include operations, features, means, or instructions for dynamically scheduling a resource for a downlink or uplink message corresponding to a first priority value greater than a second priority value for the RACH message transmission by the UE, where the resource preempts the RACH preamble occasion, and transmitting a dynamic SFI, a dynamic grant, or both indicating the resource for the downlink or uplink message.

In some examples of the method, apparatuses, and non-transitory computer-readable medium described herein, the second indicator indicates that the uplink data occasion is non-restricted for cancellation. Some examples of the method, apparatuses, and non-transitory computer-readable medium described herein may further include operations, features, means, or instructions for dynamically scheduling a resource for a downlink or uplink message corresponding to a first priority value greater than a second priority value for the RACH message transmission by the UE, where the resource preempts the uplink data occasion, and transmitting a dynamic SFI, a dynamic grant, or both indicating the resource for the downlink or uplink message.

Some examples of the method, apparatuses, and non-transitory computer-readable medium described herein may further include operations, features, means, or instructions for receiving, from the UE, a RACH preamble in the RACH preamble occasion based on the generated RRC message.

In some examples of the method, apparatuses, and non-transitory computer-readable medium described herein, the RRC message indicates a set of RACH preamble occasions and a set of uplink data occasions, where the first indicator indicates whether the set of RACH preamble occasions is restricted for cancellation and the second indicator indicates whether the set of uplink data occasions is restricted for cancellation.

In some examples of the method, apparatuses, and non-transitory computer-readable medium described herein, the RRC message indicates a set of RACH preamble occasions and a set of uplink data occasions, where the RRC message includes a set of first indicators indicating whether respective RACH preamble occasions of the set of RACH preamble occasions are restricted for cancellation and a set of second indicators indicating whether respective uplink data occasions of the set of uplink data occasions are restricted for cancellation.

In some examples of the method, apparatuses, and non-transitory computer-readable medium described herein, the first indicator, the second indicator, or both include one-bit or multi-bit flags.

Some examples of the method, apparatuses, and non-transitory computer-readable medium described herein may further include operations, features, means, or instructions for transmitting, to the UE, a configuration message indicating a set of RACH occasion configurations, where each RACH occasion configuration of the set of RACH occasion configurations corresponds to a UE capability for handling dynamic scheduling.

Some examples of the method, apparatuses, and non-transitory computer-readable medium described herein may further include operations, features, means, or instructions for receiving a UE capability for the UE and determining to generate the RRC message including the first indicator and the second indicator based on the UE capability.

Some examples of the method, apparatuses, and non-transitory computer-readable medium described herein may further include operations, features, means, or instructions for receiving a UE capability for an additional UE and configuring the additional UE for a cell that supports conflict avoidance between dynamically scheduled resources and RACH preamble occasions and uplink data occasions based on the UE capability.

Some examples of the method, apparatuses, and non-transitory computer-readable medium described herein may further include operations, features, means, or instructions for receiving a UE capability for an additional UE, transmitting, to the additional UE, a message configuring an additional RACH preamble occasion and an additional uplink data occasion for an additional RACH message transmission by the additional UE, and dynamically scheduling a resource for a downlink or uplink message corresponding to a first priority value greater than a second priority value for the additional RACH message transmission by the additional UE, where the resource may be scheduled based on the additional RACH preamble occasion and the additional uplink data occasion to avoid a scheduling conflict between the resource and the additional RACH preamble occasion and the additional uplink data occasion based on the UE capability.

A method for wireless communications at a base station is described. The method may include transmitting, to a UE, a message configuring a RACH preamble occasion and an uplink data occasion for a RACH message transmission by the UE, dynamically scheduling a resource for a downlink or uplink message corresponding to a first priority value greater than a second priority value for the RACH message transmission by the UE, where the resource is scheduled based on the RACH preamble occasion and the uplink data occasion to avoid a scheduling conflict between the resource and the RACH preamble occasion and the uplink data occasion, and transmitting a dynamic SFI, a dynamic grant, or both indicating the resource for the downlink or uplink message.

An apparatus for wireless communications at a base station is described. The apparatus may include a processor, memory in electronic communication with the processor, and instructions stored in the memory. The instructions may be executable by the processor to cause the apparatus to transmit, to a UE, a message configuring a RACH preamble occasion and an uplink data occasion for a RACH message transmission by the UE, dynamically schedule a resource for a downlink or uplink message corresponding to a first priority value greater than a second priority value for the RACH message transmission by the UE, where the resource is scheduled based on the RACH preamble occasion and the uplink data occasion to avoid a scheduling conflict between the resource and the RACH preamble occasion and the uplink data occasion, and transmit a dynamic SFI, a dynamic grant, or both indicating the resource for the downlink or uplink message.

Another apparatus for wireless communications at a base station is described. The apparatus may include means for transmitting, to a UE, a message configuring a RACH preamble occasion and an uplink data occasion for a RACH message transmission by the UE, means for dynamically scheduling a resource for a downlink or uplink message corresponding to a first priority value greater than a second priority value for the RACH message transmission by the UE, where the resource is scheduled based on the RACH preamble occasion and the uplink data occasion to avoid a scheduling conflict between the resource and the RACH preamble occasion and the uplink data occasion, and means for transmitting a dynamic SFI, a dynamic grant, or both indicating the resource for the downlink or uplink message.

A non-transitory computer-readable medium storing code for wireless communications at a base station is described. The code may include instructions executable by a processor to transmit, to a UE, a message configuring a RACH preamble occasion and an uplink data occasion for a RACH message transmission by the UE, dynamically schedule a resource for a downlink or uplink message corresponding to a first priority value greater than a second priority value for the RACH message transmission by the UE, where the resource is scheduled based on the RACH preamble occasion and the uplink data occasion to avoid a scheduling conflict between the resource and the RACH preamble occasion and the uplink data occasion, and transmit a dynamic SFI, a dynamic grant, or both indicating the resource for the downlink or uplink message.

DETAILED DESCRIPTION

Figure 1:
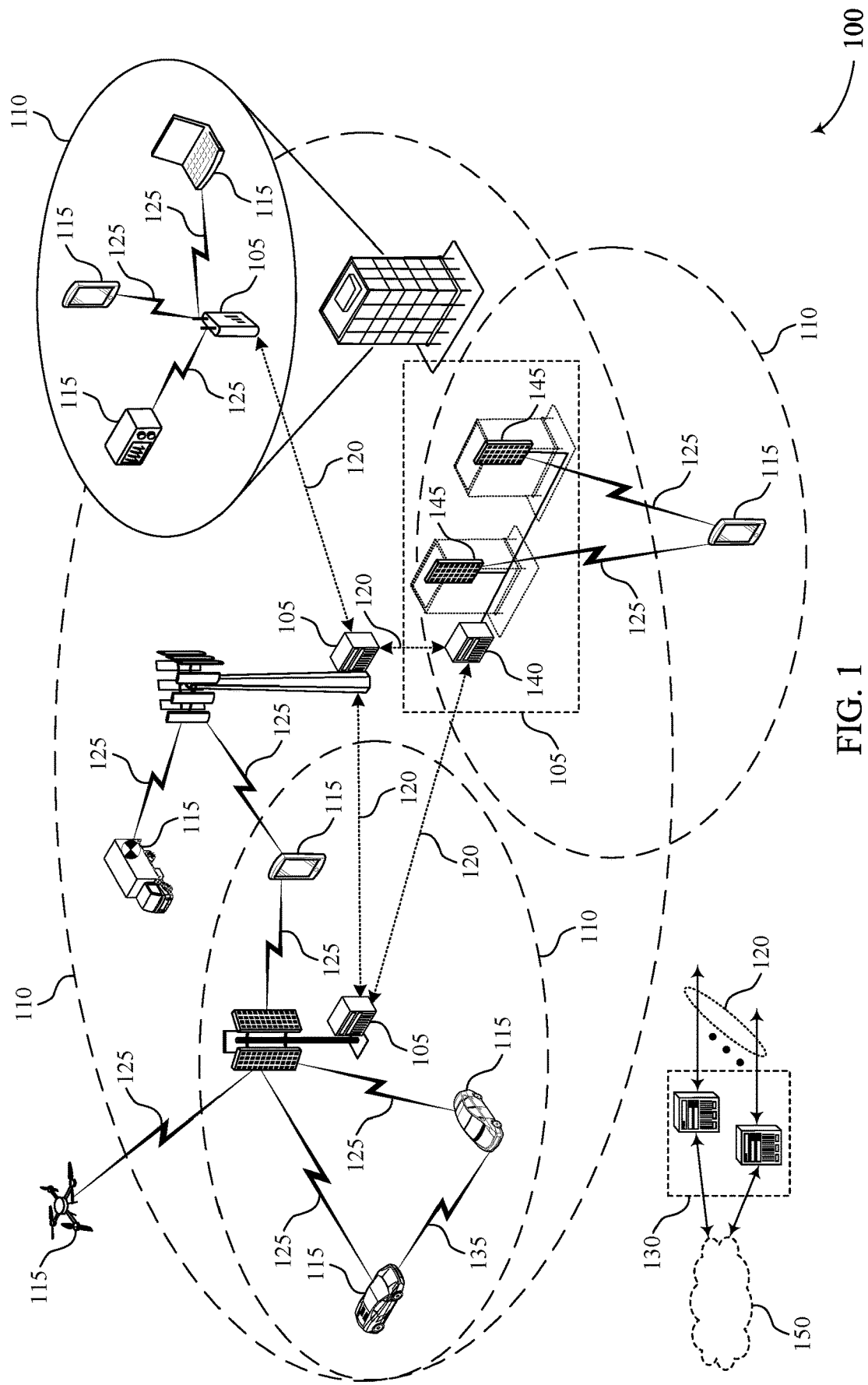
FIGS. 1 and 2 illustrate examples of wireless communications systems that support handling conflicts between dynamic scheduling and random access channel (RACH) resources in accordance with aspects of the present disclosure.

In some wireless communications systems, a user equipment (UE) may perform a random access channel (RACH) procedure with a base station. Performing the RACH procedure may involve the UE transmitting a RACH preamble and a RACH payload. If performing 2-step RACH, the UE may transmit a RACH preamble and a RACH payload, referred to as a RACH Message A (MsgA), before receiving a response message (e.g., a RACH Message B (MsgB), which may include a random access response (RAR)) from the base station. If performing 4-step RACH, the UE may transmit the RACH preamble, referred to as a RACH Message 1 (Msg1), before receiving the RAR (e.g., in the first two steps of the 4-step RACH procedure). The UE may then transmit a RACH Message 3 (Msg3), which may be an example of an uplink data payload, and may receive a RACH Message 4 (Msg4) from the base station in response. The UE may use the RACH procedure to gain uplink synchronization with the base station and to obtain resources for transmitting a RACH payload, such as a radio resource control (RRC) connection request. The RACH preamble may be transmitted using a random access preamble occasion (RO) and the RACH payload may be transmitted using an uplink data occasion (e.g., a physical uplink shared channel (PUSCH) occasion (PO)). However, in some cases, performing a RACH procedure may lead to decreased performance at the base station.

If the UE performs contention-based random access (CBRA), the UE may select the RO and the PO from among a set of ROs and POs and may transmit the RACH preamble and the RACH payload accordingly. However, the RACH preamble and/or RACH payload may interfere with uplink or downlink transmissions scheduled by the base station, which may result in collisions at the base station (e.g., preventing the base station from successfully decoding the RACH preamble, the RACH payload, an uplink transmission, etc.). For example, the base station may dynamically schedule high priority messaging (e.g., messages with relatively higher priorities than the RACH messaging) preempting the selected RO, PO, or both. Preempting the RO, PO, or both may allow the base station to meet latency goals or requirements for the high priority messaging.

In some cases, to prevent the RACH preamble and/or the RACH payload from interfering with dynamically scheduled uplink or downlink transmissions, the base station may identify the ROs and POs configured for the UE and may avoid scheduling transmissions in resources that overlap with the ROs and POs. Additionally or alternatively, the base station may indicate eligibilities for cancellation when configuring the ROs and/or POs. The base station may transmit a message to the UE (e.g., via RRC signaling) indicating that some of the ROs and/or POs are eligible for cancellation (i.e., non-restricted ROs or POs) and some of the ROs and/or POs are not eligible for cancellation (i.e., restricted ROs or POs). The base station may refrain from dynamically scheduling other messages in resources overlapping with ROs, POs, or both that are restricted for cancellation.

If the UE selects a restricted RO and a restricted PO for a RACH procedure, the UE may transmit the RACH preamble in the RO and the RACH payload in the PO, and the base station may avoid scheduling transmissions in the restricted RO and PO. If the UE selects a restricted RO and a non-restricted PO, the UE may monitor for dynamic scheduling (e.g., a grant or a slot format indication (SFI)) and may cancel transmission of the RACH payload in the PO if dynamic scheduling is received that preempts the non-restricted PO (i.e., schedules a transmission overlapping the resources of the PO). If the UE selects a non-restricted RO and a non-restricted PO, the UE may monitor for dynamic scheduling (e.g., a grant or an SFI) and may cancel transmission of the RACH preamble, RACH payload, or both if dynamic scheduling preempting one or both of the selected occasions is received.

Aspects of the disclosure are initially described in the context of a wireless communications system. Additional aspects of the disclosure are described in the context of an additional wireless communications system, RACH communication schemes, and a process flow. Aspects of the disclosure are further illustrated by and described with reference to apparatus diagrams, system diagrams, and flowcharts that relate to handling conflicts between dynamic scheduling and random access resources.

FIG. 1 illustrates an example of a wireless communications system 100 that supports handling conflicts between dynamic scheduling and RACH resources in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may perform a 2-step RACH procedure or a 4-step RACH procedure. A 2-step RACH procedure may involve a UE 115 transmitting a message including a RACH preamble and a RACH payload (i.e., MsgA) in TDMed resources and a base station 105, upon receiving the message, transmitting a response message (i.e., MsgB). A 4-step RACH procedure, meanwhile, may involve a UE 115 transmitting a RACH preamble (i.e., Msg1) and receiving, from a base station 105, a RAR (i.e., a RACH Message 2 (Msg2)). In response to receiving the RAR, the UE 115 may transmit a RACH payload (i.e., Msg3) and receive, from the base station 105, an acknowledgement (ACK) that the payload was received (i.e., Msg4).

In some cases, a UE 115 may have an associated RRC state. For instance, the UE 115 may be in one of an RRC_IDLE state, an RRC_INACTIVE state, and an RRC_CONNECTED state. Each of these states may support MsgA or Msg1 transmission.

For the RRC_IDLE or RRC_INACTIVE states, the configurations for the RACH preamble (e.g., MsgA preamble or Msg1) and the RACH payload (e.g., MsgA payload or Msg3) may be broadcast in system information (SI). Additionally, rules to assist a UE 115 in selection of an appropriate configuration option for the RACH procedure may be broadcast in the SI. Multiple configuration options for the RACH MsgA and/or Msg1 may be supported, which may include time domain resources, frequency domain resources, code domain resources, a transport block size (TBS), a modulation and coding scheme (MCS), preamble-to-PUSCH resource unit mapping, or any combination of these or other relevant configuration options for RACH procedures.

For the RRC_CONNECTED state, a base station 105 may signal configurations for RACH MsgA and Msg1 transmissions in RRC signaling, as well as selection rules for selecting RACH MsgA or Msg1. If the UE 115 receives and decodes the RRC signaling, the UE 115 may select from among the configurations received in both system information (SI) and RRC signaling, or the UE 115 may select from the configurations received in RRC signaling. If the UE 115 is unable to decode the RRC signaling, however, the UE 115 may suspend transmission of MsgA or Msg1 or may fall back to the configurations and/or rules indicated in SI (e.g., SI received when the UE 115 is in the RRC_IDLE or RRC_INACTIVE states, or SI received when the UE 115 is in the RRC_CONNECTED state).

For a UE 115 in an RRC_CONNECTED state, RACH resources in the time domain, frequency domain, code domain, or a combination thereof may be configured by RRC signaling for MsgA or Msg1. These RACH resources may be "new" RACH resources (e.g., different than the RACH resources configured in SI or previous RRC signaling). For instance, the UE 115 may receive code domain resources that include preamble sequences for the MsgA preamble or Msg1 and/or demodulation reference signal (DMRS) sequences for the MsgA payload.

In some cases, a UE 115 may perform a contention-free random access (CFRA) procedure or a CBRA procedure. Performing a CFRA procedure may involve the UE 115 receiving a dedicated RACH preamble from a base station 105 and using the preamble as the RACH preamble for MsgA or Msg1. In some cases, CFRA may be used for handover (HO), transmitting a beam failure report (BFR), or some combination of these or other relatively high priority RACH procedures (e.g., relative to CBRA RACH procedures). Performing CBRA may involve the UE 115 selecting among one or more RACH preambles and using the selected RACH preamble for MsgA or Msg1. In some cases, the selection may be random. These one or more RACH preambles may be available for selection by other UEs 115, allowing for multiple UEs 115 to select the same RACH preamble. Generally, UEs 115 that perform a CFRA procedure may experience contention with other UEs 115 less frequently than UEs 115 that performs CBRA. However, UEs 115 that perform a CBRA procedure may do so without first receiving a dedicated preamble from a base station 105.

In some cases, a UE 115 may receive a message configuring an RO and a PO. The message may be, for instance, an RRC message or an SI message. The UE 115 may determine if the RO, the PO, or both are restricted for cancellation based on the message. The UE 115 may determine when to monitor a downlink control channel (e.g., for dynamic signaling preempting the RO, PO, or both) based on determining which occasions are restricted for cancellation and may transmit a RACH message (e.g., a RACH MsgA, a RACH MsgA preamble, a RACH Msg1, etc.) based on determining when to monitor the downlink control channel.

Figure 2:
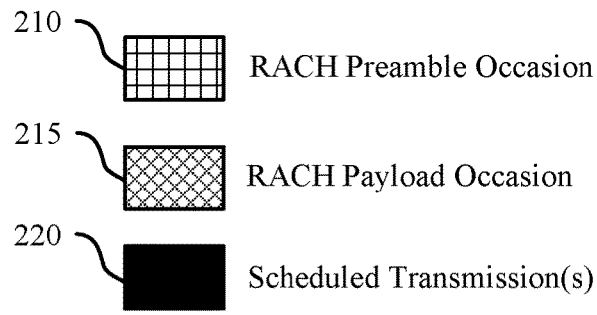
Figure 2:
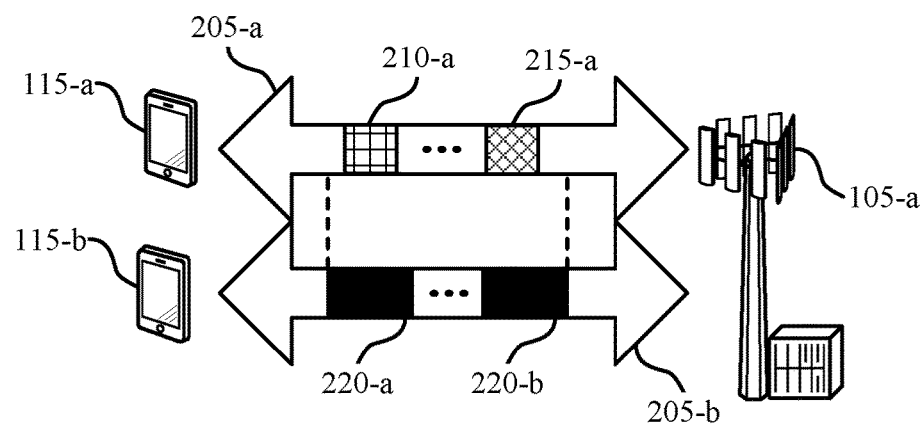

FIG. 2 illustrates an example of a wireless communications system 200 that supports handling conflicts between dynamic scheduling and RACH resources in accordance with aspects of the present disclosure. In some examples, wireless communications system 200 may implement aspects of wireless communications system 100. For instance, wireless communications system 200 may include a UE 115-a and a UE 115-b, which may be examples of UEs 115 as described with reference to FIG. 1, and a base station 105-a, which may be an example of a base station 105 as described with reference to FIG. 1. UE 115-a may communicate with base station 105-a over communication channel 205-a and UE 115-b may communicate with base station 105-b over communication channel 205-b.

As described with reference to FIG. 1, a UE 115, such as UE 115-a, may receive resources for a RACH procedure from RRC signaling. For example, base station 105-a may configure one or more RACH preamble occasions 210 and one or more RACH payload occasions 215 for UE 115-a. Among the RRC configured resources that a UE 115 may receive for the RACH procedure (e.g., 2-step RACH and/or 4-step RACH), a first subset may be used for CFRA and a second subset may be used for CBRA. Alternatively, in some cases, base station 105-a may configure the UE 115 with all CFRA resources or all CBRA resources. For CFRA, RRC-configured time and frequency resources for a preamble occasion (i.e., RO) and an uplink occasion (i.e., PO) may not conflict with dynamically scheduled transmissions 220 (e.g., uplink or downlink transmissions) based on scheduling rules at base station 105-a. For CBRA, RRC-configured time or frequency resources for a preamble occasion (i.e., RO) and/or an uplink occasion (i.e., PO) may conflict with dynamically scheduled transmissions 220 (e.g., uplink or downlink transmissions) with higher priority.

For instance, as illustrated in FIG. 2, RACH preamble occasion 210-a and RACH payload occasion 215-a may be scheduled for resources at least partially overlapping in time and/or frequency with resources for dynamically scheduled transmission 220-a, 220-b, or both. Scheduled transmissions 220 may have a higher priority than a RACH message based on the contents of the scheduled transmissions 220, priority values associated with the scheduled transmissions 220, and/or being scheduled by dynamic scheduling, such as a dynamic SFI or a dynamic downlink or uplink grant for preemption. In some cases, base station 105-a may schedule UE 115-a with multiple CBRA ROs and POs. UE 115-a may select one of each for a RACH MsgA transmission (or multiple candidate pairs, as described herein) or may select an RO for a RACH Msg1 transmission (or multiple candidate ROs).

Methods of limiting conflicts between RACH resources (e.g., RRC-configured RACH resources) and dynamic scheduling may be described with reference to FIGS. 3 through 5C. Such methods may improve the flexibility of scheduling without any significant performance degradation of high priority control or data transmissions.

Figure 3:
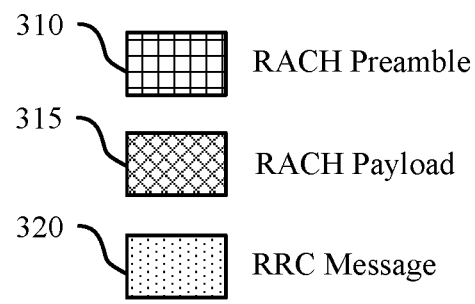
FIGS. 3, 4A, 4B, 5A, 5B, and 5C illustrate examples of RACH communications schemes that support handling conflicts between dynamic scheduling and RACH resources in accordance with aspects of the present disclosure.
Figure 3:
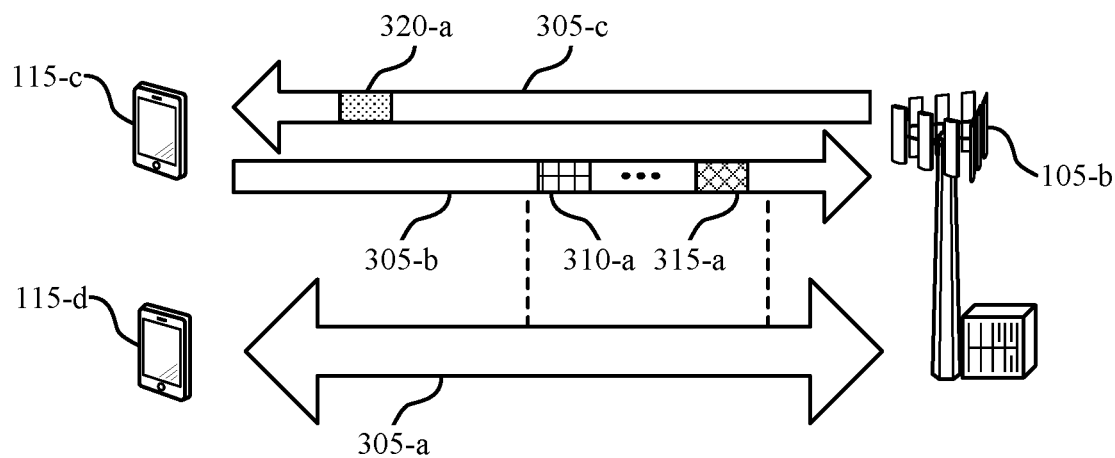

FIG. 3 illustrates an example of a RACH communications scheme 300 that supports handling conflicts between dynamic scheduling and RACH resources in accordance with aspects of the present disclosure. In some examples, RACH communications scheme 300 may implement aspects of wireless communications systems 100 and 200. For instance, RACH communications scheme 300 may represent a scheme that a UE 115 (e.g., UE 115-c) and a base station 105 (e.g., base station 105-b) may use to avoid collisions between RACH transmissions and dynamically scheduled transmissions. UE 115-c may communicate with base station 105-b over one or more communication channels (e.g., including an uplink communication channel 305-b and a downlink communication channel 305-c). UE 115-d may communication with base station 105-b over communication channel 305-a.

In some cases, base station 105-b may configure UE 115-c with sets of ROs and POs that correspond to different group classifications. These RO and/or PO groups may be mutually exclusive. The classifications may be based on the priority of random access, the status of resource sharing (e.g., CFRA or CBRA), or both. In one example, ROs and POs configured by SI may be classified into one group (i.e., SI-group). In some examples, the SI-group may configure ROs, POs, or both for CBRA, CFRA, or both. ROs configured by RRC signaling and used for CFRA may be classified into another group (i.e., RO-CFRA-RRC group). Such ROs may be dedicated to CFRA or may be shared by CFRA and CBRA. POs configured by RRC signaling may be classified into yet another group (i.e., PO-RRC-group). Such POs may be dedicated to CFRA, dedicated to CBRA, or shared by CFRA and CBRA. ROs configured by RRC signaling and dedicated to CBRA may be classified into yet another group (i.e., RO-CBRA-RRC group). Base station 105-b, UE 115-c, or both may identify these group classifications for configured ROs and/or POs.

In some cases, particular group classifications may correspond to particular eligibilities for preemption. For example, ROs and POs in the SI-group and the RO-CFRA-RRC group may be ineligible for preemption and/or cancellation by dynamic scheduling (e.g., based on the priority of random access, the status of resource sharing, or both for these groups). In contrast, ROs and POs in the PO-RRC-group and the RO-CBRA-RRC group may be eligible for preemption and/or cancellation on a per-slot basis by dynamic scheduling of transmissions with higher priorities than the RACH messaging.

One method by which base station 105-b may avoid conflicts between transmission of a RACH MsgA (e.g., including a RACH preamble 310 and a RACH payload 315) or a RACH Msg1 (e.g., including a RACH preamble 310) and dynamic scheduling is by implementing a constraint to the timeline for dynamic scheduling, a constraint to the resource allocation for dynamic scheduling or both. Base station 105-b may notify UE 115-c of the dynamic scheduling by transmitting a dynamic SFI and/or a dynamic uplink or downlink grant to UE 115-c (e.g., in a downlink communication channel 305-c, such as a downlink control channel). For instance, base station 105-b may avoid scheduling transmissions such that the resources allocated for the transmissions even partially overlap with the RO associated with RACH preamble 310-a and the PO associated with the RACH payload 315-a indicated in an RRC message 320 (e.g., via RRC signaling). In some cases, base station 105-b may dynamically schedule high priority transmissions such that there is a processing buffer between the dynamically scheduled resources and any RO or PO configured for RACH messaging (e.g., based on processing capabilities of base station 105-b or a UE 115). In such cases, UE 115-c may not monitor a downlink control channel for dynamic scheduling preempting the RACH preamble occasion or the RACH payload occasion, as base station 105-b may ensure that such preemption does not occur on the network side (e.g., based on the scheduling rules).

Additionally or alternatively, base station 105-b may indicate which ROs and POs are cancellable or preemptible such that UE 115-c may adapt its control channel monitoring or decoding (e.g., physical downlink control channel (PDCCH) monitoring or decoding) and uplink transmission. Base station 105-b may provide the indication via an RRC message 320 (e.g., in an RRC message 320-a) and may provide an indication of cancellation eligibility for individual POs and/or ROs (e.g., the POs and ROs being indicated by the RRC signaling) or for groups of POs and/or ROs (e.g., all of the POs and/or ROs configured in an RRC message 320-a, the SI-group, the RO-CFRA-RRC group, the PO-RRC group, the RO-CBRA-RRC group, etc.).

In one example, if RO resources in the RO-CFRA-RRC group are restricted for cancellation, base station 105-b may signal the status of restriction when configuring ROs with assigned CFRA preamble sequences via an RRC message 320. For instance, a 1-bit flag may be included in an RO configuration field of an RRC message 320-a (e.g., RO_Restricted) which indicates that a given RO or RO group is ineligible for cancellation if the value of the flag is a first bit value (e.g., "1") and indicates that the given RO is eligible for cancellation if the value of the flag is a second bit value (e.g., "0"). Alternatively, base station 105-b may include a multi-bit flag in an RRC message 320 to indicate eligibility for preemption. In another example, base station 105-b may flexibly signal the status of restriction for one or more POs and/or ROs. For example, base station 105-b may indicate the status of restriction for POs and/or ROs associated with the PO-RRC group or the RO-CBRA-RRC group, respectively, when the POs and/or ROs are configured by an RRC message 320 and used for CFRA. For instance, a 1-bit flag may be included in the RO and/or PO configuration field of an RRC message 320-a (e.g., RO_Restricted or PO_Restricted). In some cases, if RO_Restricted=1, the corresponding RO (or RO group, such as RO-CFRA-RRC group or RO-CBRA-RRC group) may be ineligible for cancellation (i.e., restricted); otherwise, the RO (or RO group) may be eligible for cancellation by dynamic scheduling (i.e., non-restricted). If PO_Restricted=1, the corresponding PO (or PO group) may be ineligible for cancellation; otherwise the PO (or PO group) may be eligible for cancellation by dynamic scheduling. In yet another example, RO and PO resources configured by SI (e.g., those in SI-group) may be considered restricted for cancellation without receiving an explicit indication in the SI message (e.g., based on the priority of SI scheduling). Specifically, an SI message scheduling ROs, POs, or both may not include the indicators described herein for scheduling ROs, POs, or both in an RRC message 320.

In the present example, UE 115-c may transmit a MsgA or Msg1 using a restricted RO and/or restricted PO selected by UE 115-c (e.g., if performing CBRA) or configured for UE 115-c (e.g., if performing CFRA). For instance, ROs and POs within the SI-group and the RO-CFRA-RRC group may be ineligible for preemption (e.g., cancellation) by dynamic scheduling. For example, base station 105-b may not transmit an SFI or grant dynamically scheduling a transmission in resources configured for these ROs and POs. ROs and POs within the PO-RRC group and the RO-CBRA-RRC group may be canceled or preempted if they conflict with dynamic scheduling with higher priority. The cancellation or preemption may occur on a per-slot basis. In a specific example, the RO and PO used by UE 115-c to transmit MsgA or Msg1 may be from the SI-group and/or the RO-CFRA-RRC group. In such an example, UE 115-c may not monitor for a dynamic SFI or dynamic grant preempting the transmission of the MsgA or Msg1 in the RO and PO.

Using the selected or configured restricted RO and/or PO, UE 115-c may transmit RACH preamble 310-a (e.g., a Msg1 or MsgA preamble) to base station 105-b in the RO. If UE 115-c performs a two-step RACH procedure, UE 115-c may also transmit a RACH payload 315-a (e.g., a MsgA payload). Base station 105-b, determining that the selected or configured RO and PO are ineligible for cancellation, may refrain from transmitting a dynamic SFI or dynamic grant scheduling resources that overlap with RACH preamble 310-a and RACH payload 315-a. By avoiding scheduling resources that overlap with RACH preamble 310-a and RACH payload 315-a, RACH preamble 310-a and RACH payload 315-a may not conflict with any dynamically scheduled uplink and downlink transmissions between a UE 115 (e.g., UE 115-d, UE 115-c, etc.) and base station 105-b.

Figure 4A:
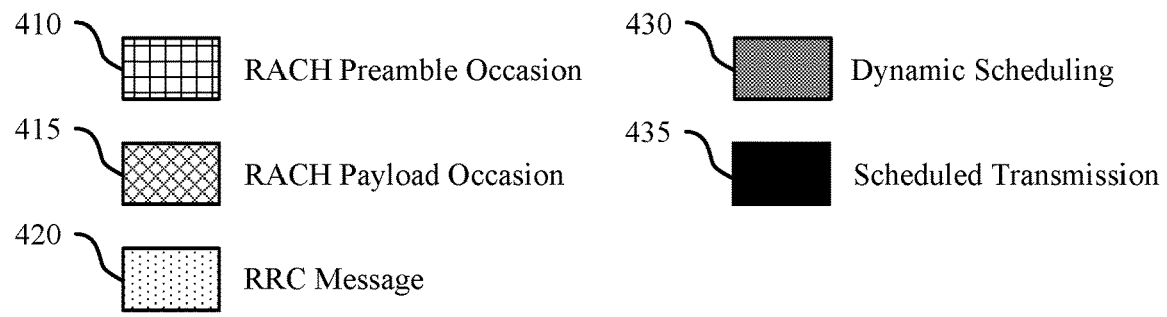
Figure 4A:
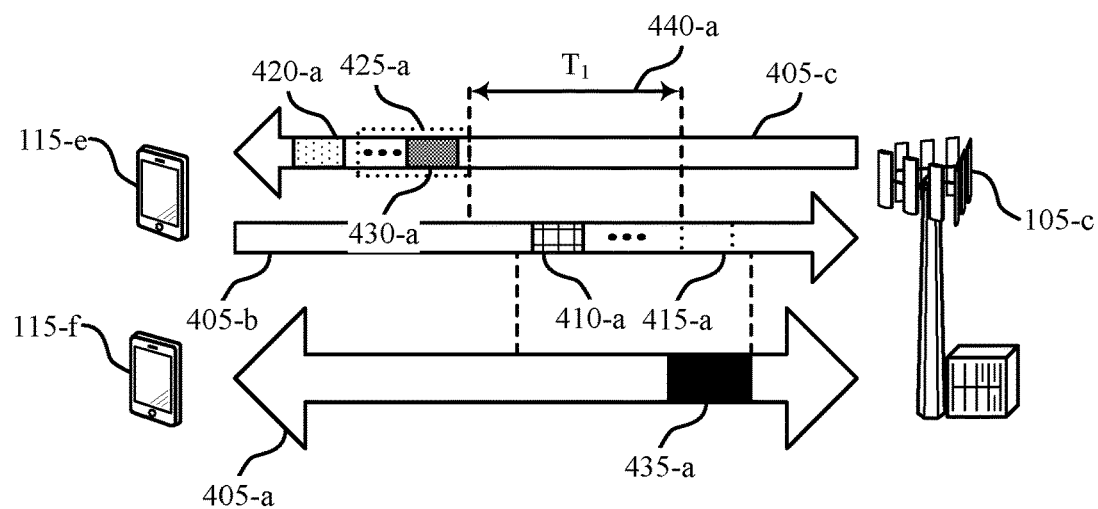
Figure 4B:
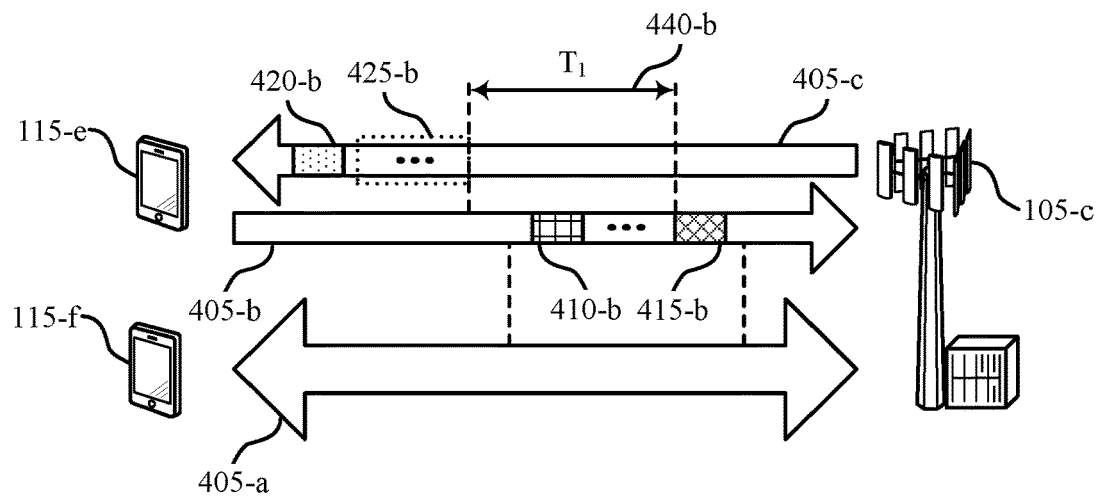

FIGS. 4A and 4B illustrate examples of RACH communications schemes 400-a and 400-b that support handling conflicts between dynamic scheduling and RACH resources in accordance with aspects of the present disclosure. In some examples, RACH communications schemes 400-a and 400-b may implement aspects of wireless communications systems 100 or 200. For instance, RACH communications schemes 400-a and 400-b may represent schemes that a UE 115 (e.g., UE 115-e) and a base station 105 (e.g., base station 105-c) may use to avoid collisions between RACH transmissions and dynamically scheduled transmissions. UE 115-e may communicate with base station 105-c on uplink communication channel 405-b and downlink communication channel 405-c. UE 115-f may communicate with base station 105-c on communication channel 405-a.

UE 115-e may receive an RRC message 420 (e.g., via RRC signaling) that configures ROs (e.g., RACH preamble occasions 410) and POs (e.g., RACH payload occasions 415) as described with reference to FIG. 3. In the present example, UE 115-e may select an RO that is ineligible for cancellation (e.g., base station 105-c will not preempt with a dynamically scheduled transmission) and may select a PO that is eligible for cancellation (i.e., a non-restricted PO that base station 105-c may preempt with a dynamically scheduled transmission). In such cases, UE 115-e may monitor for dynamic scheduling 430 (e.g., a grant or SFI) during a monitoring window 425-a. For example, UE 115-e may monitor a downlink control channel for a message scheduling a transmission (e.g., a downlink or uplink transmission) that preempts the PO. The monitoring window 425-a may end at a start of a time interval $T_1$ 440-a.

As illustrated in FIG. 4A, UE 115-e may receive RRC message 420-a configuring at least RACH preamble occasion 410-a and RACH payload occasion 415-a. UE 115-e may detect dynamic scheduling 430-a in monitoring window 425-a and may cancel a transmission of a RACH payload in a RACH payload occasion 415 (i.e., the selected or configured PO, RACH payload occasion 415-a). In such cases, UE 115-e may transmit a RACH preamble (e.g., a Msg1 or a MsgA preamble) in RACH preamble occasion 410-a without transmitting a RACH payload in RACH payload occasion 415-a. Dynamic scheduling 430-a may indicate resources that overlap with the non-restricted PO and a UE 115 (e.g., UE 115-f) or base station 105-a may transmit a scheduled transmission 435-a over the indicated resources. These indicated resources may conflict with the PO (e.g., RACH payload occasion 415-a). By avoiding scheduling resources for a high-priority transmission that overlap with the restricted RO, base station 105-c may ensure that the RACH preamble transmission in the RACH preamble occasion 410-a does not collide with a scheduled transmission 435 between a UE 115 and base station 105-c. Additionally, by UE 115-e detecting the dynamic scheduling 430-a and canceling the RACH payload, scheduled high-priority transmission 435-a may not collide with a RACH payload transmission.

As illustrated in FIG. 4B, UE 115-e may receive RRC message 420-b configuring at least RACH preamble occasion 410-b and RACH payload occasion 415-b. UE 115-e may not detect dynamic scheduling 430 (e.g., an SFI or grant transmitted over the downlink control channel) in monitoring window 425-b. For example, UE 115-e may monitor up to the end of the monitoring window 425-b defined by a time interval $T_1$ 440-b. Accordingly, UE 115-e may transmit a RACH preamble in the selected or configured RO (i.e., RACH preamble occasion 410-b) and may transmit a RACH payload in the selected or configured PO (i.e., RACH payload occasion 415-b). The RACH preamble and RACH payload may correspond to a RACH MsgA transmission. As UE 115-e does not detect dynamic scheduling 430 during the monitoring window 425-b, it may be relatively unlikely that base station 105-c has transmitted dynamic scheduling 430 that indicates resources overlapping with the PO. As such, there may be a lower chance that the RACH payload transmitted in RACH payload occasion 415-b collides with a scheduled transmission 435 (e.g., as compared to if base station 105-c transmitted dynamic scheduling 430 indicating resources overlapping with the PO), improving the RACH message reliability.

In some cases, if UE 115-e selects an RO that is ineligible for cancellation, UE 115-e may transmit a RACH Msg1 using the RO without monitoring the monitoring window 425-a for dynamic scheduling preempting the RO (e.g., based on the ineligibility for cancellation) or a PO. In such cases, UE 115-e may avoid selecting or using a PO, regardless of if the PO is non-restricted or restricted (e.g., based on transmitting a RACH Msg1 in a four-step RACH procedure). As such, base station 105-*e* may schedule transmissions in resources that overlap with potential POs.

The time interval $T_1$ may be based on processing capabilities of UE 115-*e*. For example, time interval $T_1$ may define a processing time for UE 115-*e* to receive an SFI or grant dynamically scheduling a high-priority transmission, decode the SFI or grant, and process the SFI or grant to determine the scheduled transmission. The time interval $T_1$ may indicate a time prior to the RACH payload occasion 415 after which the UE 115-*e* may not be able to receive and process dynamic scheduling 430 in time to drop the RACH payload transmission from the RACH payload occasion 415. In some cases, UE 115-*e* may be pre-configured with a $T_1$ value.

Figure 5A:
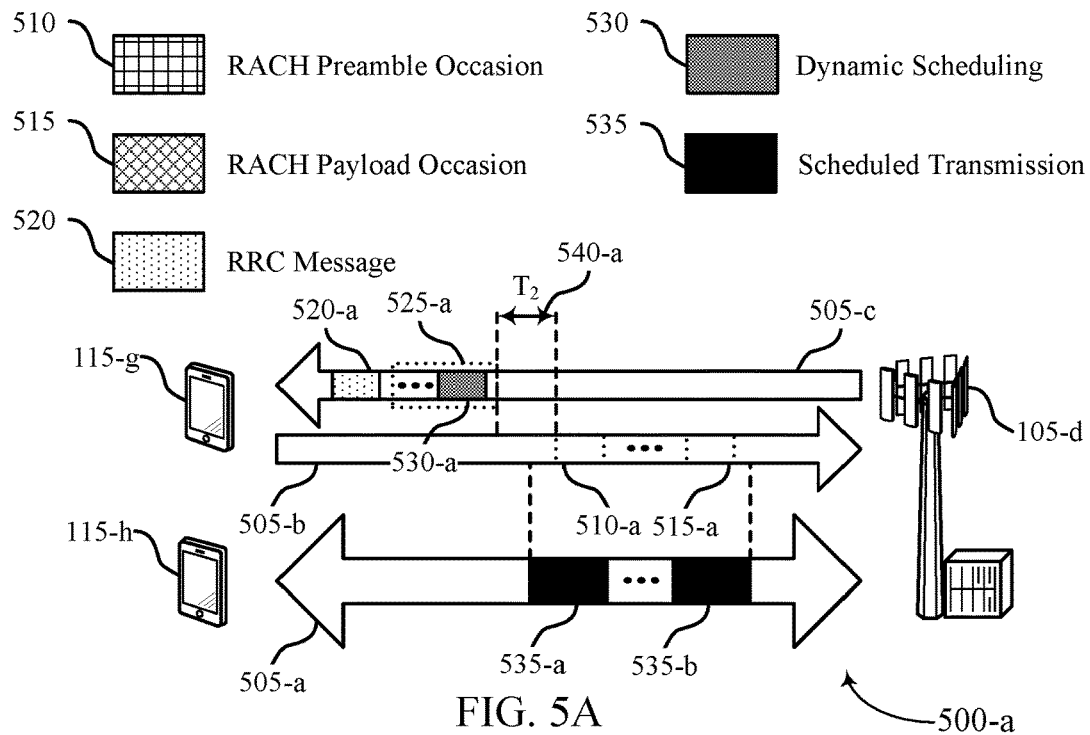
Figure 5B:
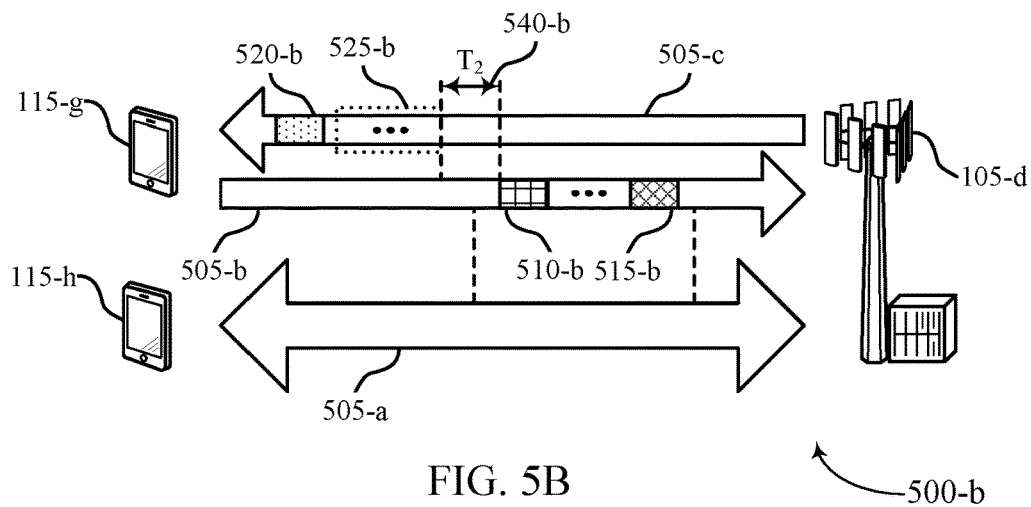
Figure 5C:
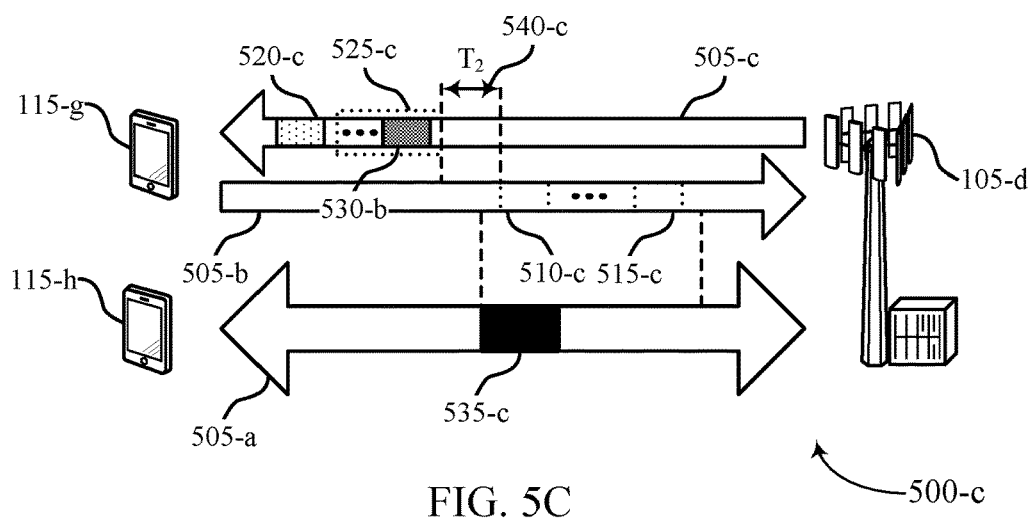

FIGS. 5A, 5B, and 5C illustrate examples of RACH communications schemes 500-*a*, 500-*b*, and 500-*c* that support handling conflicts between dynamic scheduling and RACH resources in accordance with aspects of the present disclosure. In some examples, RACH communications schemes 500-*a*, 500-*b*, and 500-*c* may implement aspects of wireless communications systems 100 or 200. For instance, RACH communications schemes 500-*a*, 500-*b*, and 500-*c* may represent schemes that a UE 115 (e.g., UE 115-*g*) and a base station 105 (e.g., base station 105-*d*) may use to avoid collisions between RACH transmissions and dynamically scheduled transmissions. UE 115-*g* may communicate with base station 105-*d* over an uplink communication channel 505-*b* and a downlink communication channel 505-*c*. UE 115-*h* may communicate with base station 105-*d* over communication channel 505-*a*.

UE 115-*g* may receive an RRC message 520 (e.g., via RRC signaling) that configures ROs (e.g., RACH preamble occasions 510) and POs (e.g., RACH payload occasions 515), such as described with reference to FIGS. 3, 4A, and 4B. In the present example, UE 115-*g* may select a non-restricted RO and a non-restricted PO (e.g., ROs from RO-CBRA-RRC group and POs from PO-RRC group). In such cases, UE 115-*g* may monitor for dynamic scheduling 530 (e.g., a grant or SFI) over a monitoring window. The monitoring window 525-*a* may end at a start of a time interval $T_2$. Additionally or alternatively, UE 115-*g* may monitor a downlink control channel for dynamic scheduling 530 preempting a RACH preamble occasion 510 up to the time interval $T_2$ and may continue monitoring the downlink control channel for dynamic scheduling 530 preempting a RACH payload occasion 515 up to a time interval $T_1$. UE 115-*g* may determine whether to transmit a RACH preamble, a RACH payload, or both based on whether UE 115-*g* detects dynamic scheduling 530 scheduling a transmission 535 conflicting with the selected RO, PO, or both.

As illustrated in FIG. 5A, UE 115-*g* may receive RRC message 520-*a* configuring at least RACH preamble occasion 510-*a* and RACH payload occasion 515-*a*. UE 115-*g* may detect dynamic scheduling 530-*a* in monitoring window 525-*a* (e.g., prior to a time interval $T_2$ 540-*a*, a time interval $T_1$ as described with reference to FIGS. 4A and 4B, or both). Dynamic scheduling 530-*a* may indicate resources that overlap with the non-restricted RO and the non-restricted PO, and a UE 115 (e.g., UE 115-*h*) or base station 105-*d* may transmit scheduled transmission 535-*a* and/or 535-*b* over the indicated resources. Based on detecting the dynamic scheduling 530-*a*, UE 115-*g* may cancel a transmission of a RACH message (e.g., including a RACH preamble in RACH preamble occasion 510-*a* and a RACH payload in RACH payload occasion 515-*a*). By UE 115-*g* detecting the dynamic scheduling 530-*a* and canceling transmission of the RACH message in these occasion(s) (e.g., any RACH message, such as a RACH MsgA or RACH Msg1), scheduled transmissions 535-*a* and/or 535-*b* may not collide with the RACH message. UE 115-*g* may transmit the RACH message in a subsequent RACH opportunity (e.g., subsequent RACH resources that are not preempted by dynamically scheduled transmissions 535).

As illustrated in FIG. 5B, UE 115-*g* may receive RRC message 520-*b* configuring at least RACH preamble occasion 510-*b* and RACH payload occasion 515-*b*. UE 115-*g* may not detect dynamic scheduling 530 in monitoring window 525-*b* (e.g., prior to a time interval $T_2$ 540-*b*, a time interval $T_1$ as described with reference to FIGS. 4A and 4B, or both) and may transmit a RACH preamble in the RO and a RACH payload in the PO. For example, UE 115-*g* may transmit a RACH preamble (e.g., a MsgA preamble) in RACH preamble occasion 510-*b* and a RACH payload (e.g., a MsgA payload) in RACH payload occasion 515-*b*. As UE 115-*g* does not detect dynamic scheduling 530 during the monitoring window 525-*b*, there may be a relatively lower probability that base station 105-*d* transmitted dynamic scheduling 530 that indicates resources overlapping with the selected RO and/or PO. As such, there may be a lower chance that the transmitted RACH preamble and/or RACH payload collides with a scheduled transmission 535 between base station 105-*d* and a UE 115 (e.g., UE 115-*h*).

As illustrated in FIG. 5C, UE 115-*g* may receive RRC message 520-*c* configuring at least RACH preamble occasion 510-*c* and RACH payload occasion 515-*c*. UE 115-*g* may detect dynamic scheduling 530-*b* in monitoring window 525-*c* (e.g., prior to the time interval $T_2$ 540-*c*) and may cancel a transmission of a RACH message. Dynamic scheduling 530-*b* may indicate resources that overlap (e.g., at least partially overlap or conflict) with the non-restricted RO, but not the non-restricted PO, and a UE 115 (e.g., UE 115-*h*) or base station 105-*d* may transmit a scheduled transmission 535-*c* over the indicated resources. As both RACH MsgA and Msg1 use a RACH preamble, dropping the RACH preamble occasion 510-*c* may cause UE 115-*g* to additionally drop the RACH payload occasion 515-*c* (e.g., even if the PO is not preempted). Alternatively, if the PO is preempted but not the RO, UE 115-*g* may transmit the RACH preamble in the RO (e.g., by falling back to a RACH Msg1 or by transmitting the preamble portion of a RACH MsgA). By UE 115-*g* detecting the dynamic scheduling 530-*b* and canceling the RACH message transmission (e.g., until a later RACH opportunity), scheduled transmission 535-*c* may not collide with the RACH preamble.

The time interval $T_2$ may be based on processing capabilities of UE 115-*g*. For example, time interval $T_2$ may define a processing time for UE 115-*g* to receive an SFI or grant dynamically scheduling a high-priority transmission, decode the SFI or grant, and process the SFI or grant to determine the scheduled transmission. The time interval $T_2$ may indicate a time prior to the RACH preamble occasion 510 after which the UE 115-*g* may not be able to receive and process dynamic scheduling 530 in time to drop the RACH preamble transmission from the RACH preamble occasion 510. In some cases, UE 115-*g* may be pre-configured with a $T_2$ value. Time intervals $T_1$ and $T_2$ may have the same duration or may have different durations. In some cases, these values may be configured by base station 105-*d*. In some other cases, UE 115-*g* may transmit an indication of one or both of these values to base station 105-*d*.

In some cases, a UE 115 may select multiple non-restricted ROs and/or multiple non-restricted POs within one RRC configuration period. For example, a base station 105 may indicate resource allocations for multiple candidate ROs and POs in an RRC message, and the UE 115 may select one or more pairs of candidate ROs and POs (e.g., based on a selection rule or criteria). In some such cases, the UE 115 may store a list of paired ROs and POs (i.e., candidate pairs), which in some examples may be ordered and indexed by {RO #1, PO #1}, {RO #2, PO #2}, and so on. Selecting the list may be based on reference signal received power (RSRP) measurements, link level qualities, UE capabilities, or some combination of these or other relevant parameters. If there is a conflict in uplink transmission, the UE 115 may remove the impacted pair(s) and select from the remaining candidates. For instance, if dynamic scheduling 530 indicates resources that overlap with RO #1 and PO #1, the UE 115 may transmit the RACH preamble using RO #2 and the RACH payload using RO #2. In another example, if dynamic scheduling 530 indicates resources that overlap with PO #1, but not RO #1, the UE 115 may transmit the RACH preamble using RO #2 and the RACH payload using PO #2. Alternatively, in some examples, the UE 115 may maintain unpaired lists of ROs and POs and may remove ROs and POs separately. For example, if dynamic scheduling 530 indicates resources that overlap with PO #1, but not RO #1, the UE 115 may transmit the RACH preamble using RO #1 and the RACH payload using PO #2.

In some cases, selecting a non-restricted RO and a restricted PO may be an invalid configuration. As such, a UE 115 may refrain from selecting a non-restricted RO and a restricted PO for a RACH procedure. Alternatively, a UE 115 may support selecting a non-restricted RO and a restricted PO and may handle monitoring for dynamic scheduling 530 and dropping RACH messages similar to as described with reference to FIG. 5C. For example, if the UE 115 detects dynamic scheduling 530 preempting the non-restricted RO, the UE 115 may drop the entire RACH message (e.g., including a RACH payload for a MsgA). If the UE 115 does not detect dynamic scheduling 530 preempting the non-restricted RO during a monitoring window defined based on the RO and the time interval T$_2$, the UE 115 may transmit the RACH message (e.g., without monitoring for dynamic scheduling that could preempt the restricted PO).

Figure 6:
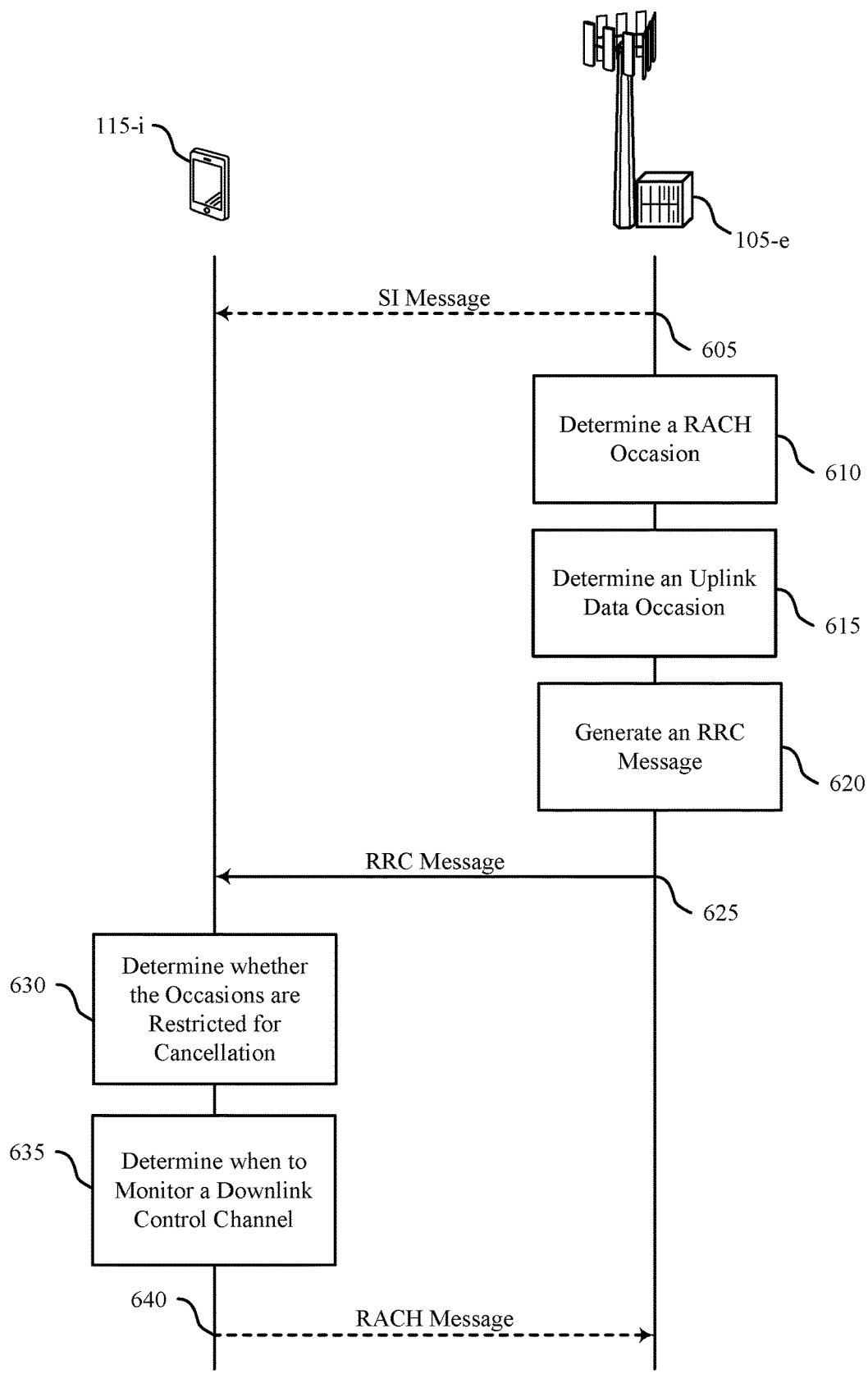
FIG. 6 illustrates an example of a process flow that supports handling conflicts between dynamic scheduling and RACH resources in accordance with aspects of the present disclosure.

FIG. 6 illustrates an example of a process flow 600 that supports handling conflicts between dynamic scheduling and RACH resources in accordance with aspects of the present disclosure. In some examples, process flow 600 may implement aspects of wireless communications systems 100 or 200. For instance, UE 115-*i* may be an example of a UE 115 as described with reference to FIGS. 1 through 5C and base station 105-*e* may be an example of base station 105 as described with reference to FIGS. 1 through 5C. Alternative examples of the following may be implemented, where some steps are performed in a different order than described or are not performed at all. In some cases, steps may include additional features not mentioned below, or further steps may be added.

At 605, base station 105-*e* may transmit an SI message that configures a RACH preamble occasion (e.g., an RO), an uplink data occasion (e.g., a PO), or both. UE 115-*i* may receive the SI message and may determine that the RACH preamble occasion and the uplink data occasion are restricted for cancellation based on receiving the configuration for the RACH preamble occasion and the uplink data occasion from an SI message.

At 610, base station 105-*e* may determine a RACH preamble occasion (e.g., an RO) for a RACH message transmission (e.g., a MsgA or Msg1) by a UE 115 (e.g., UE 115-*i*). At 615, base station 105-*e* may determine an uplink data occasion (e.g., a PO) for the RACH message transmission (e.g., a MsgA) by the UE 115.

At 620, base station 105-*e* may generate an RRC message to indicate the RACH preamble occasion and the uplink data occasion. In some cases, the RRC message may configure a resource allocation for multiple RACH preamble occasions, multiple uplink data occasions, or both. The RRC message may include a first indicator indicating whether the RACH preamble occasion is restricted or ineligible for cancellation (e.g., RO_Restricted as described with reference to FIG. 3). The RRC message may, additionally or alternatively, include a second indicator indicating whether the uplink data occasion is restricted for cancellation (e.g., PO_Restricted as described with reference to FIG. 3). The first indicator, the second indicator, or both may be one-bit or multi-bit flags. In some cases, the RRC message may indicate multiple RACH preamble occasions, multiple uplink data occasions, or both, where the first indicator may indicate whether a first group of RACH preamble occasions is restricted for cancellation and the second indicator may indicate whether a second group of uplink data occasions is restricted for cancellation. In some other cases, the RRC message may indicate multiple RACH preamble occasions, multiple uplink data occasions, or both, where the RRC message may include a respective indicator for each occasion indicating whether the occasion is restricted for cancellation.

At 625, base station 105-*e* may transmit the generated RRC message to UE 115-*i*. UE 115-*i* may receive the RRC message.

At 630, UE 115-*i* may determine if the RACH preamble occasion indicated by the RRC message, the uplink data occasion indicated by the RRC message, or both are restricted or ineligible for cancellation. UE 115-*i* may determine if the RACH preamble occasion is restricted for cancellation based on the first indicator and may determine if the uplink data occasion is restricted for cancellation based on the second indicator.

At 635, UE 115-*i* may determine when to monitor a downlink control channel (e.g., a physical downlink control channel (PDCCH)) based on determining if a configured RACH preamble occasion (e.g., a RACH preamble occasion from the RRC message or the SI message), a configured uplink data occasion (e.g., an uplink data occasion from the RRC message or the SI message), or both are restricted for cancellation. In some cases, UE 115-*i* may select the configured RACH preamble occasion from the multiple RACH preamble occasions configured in a message and/or may select the configured uplink data occasion from the multiple uplink data occasions configured in the message. The downlink control channel may correspond to a common search space or a UE-specific search space.

In one example, if UE 115-*i* determines that both the configured RACH preamble occasion and the configured uplink data occasion are restricted for cancellation (e.g., as described with reference to FIG. 3), UE 115-*i* may determine to refrain from monitoring for dynamic scheduling (e.g., a dynamic grant or a dynamic SFI) preempting the RACH preamble occasion, the uplink data occasion, or both. In another example, if UE 115-*i* determines that the RACH preamble occasion is restricted for cancellation, UE 115-*i* may transmit a Msg1 and may determine to refrain from monitoring for dynamic scheduling preempting the RACH preamble occasion, the uplink data occasion, or both (e.g., based on transmitting a RACH Msg1 without a payload and the RACH preamble occasion being restricted for cancellation).

In yet another example, if UE 115-*i* determines that the RACH preamble occasion is restricted for cancellation and that the uplink data occasion is non-restricted for cancellation, UE 115-*i* may determine to monitor the downlink control channel for dynamic scheduling preempting the uplink data occasion. If UE 115-*i* receives the dynamic scheduling for a transmission conflicting with the uplink data occasion, UE 115-*i* may refrain from transmitting, in the uplink data occasion, an uplink data message based on the receiving. In such cases, at 640, UE 115-*i* may transmit a RACH preamble as a RACH message (e.g., by transmitting a RACH preamble of a RACH MsgA or by transmitting a RACH Msg1). The downlink control channel may be monitored up to a threshold time preceding the uplink data occasion by a dynamic scheduling processing threshold duration (e.g., $T_1$ as described with reference to FIGS. 4A and 4B). In some examples, the dynamic scheduling processing threshold duration may be based on one or more UE capabilities for UE 115-*i*, a frequency band of operation, a numerology of an active bandwidth part for downlink, uplink, or both, whether a bandwidth part switch is involved, or a combination thereof.

In still another example, if UE 115-*i* determines that the RACH preamble occasion and the uplink data occasion are non-restricted for cancellation, UE 115-*i* may determine to monitor the downlink control channel for dynamic scheduling (e.g., a dynamic grant or SFI) preempting the RACH preamble occasion, the uplink data occasion, or both. If UE 115-*i* receives dynamic scheduling for a transmission preempting the RACH preamble occasion, UE 115-*i* may refrain from transmitting the RACH message at 640 in the RACH preamble occasion and the uplink data occasion and may do so in a subsequent (e.g., non-preempted) RACH preamble occasion, a subsequent (e.g., non-preempted) uplink data occasion, or both. If UE 115-*i* receives the dynamic scheduling and determines that the dynamic scheduling preempts the uplink data occasion but not the RACH preamble occasion, UE may 115-*i* may transmit a RACH preamble message in the RACH preamble occasion but may refrain from transmitting an uplink data message (e.g., a RACH payload for a MsgA). If UE 115-*i* fails to receive dynamic scheduling (e.g., UE 115-*i* does not detect dynamic scheduling for a transmission preempting either of the occasions during a monitoring window), UE 115-*i* may transmit a RACH preamble message in the RACH preamble occasion and an uplink data message in the uplink data message occasion (e.g., in a RACH MsgA transmission). In some cases, the downlink control channel may be monitored up to a threshold time preceding the RACH preamble occasion by a dynamic scheduling processing threshold duration (e.g., $T_2$ as described with reference to FIGS. 5A, 5B, and 5C). In some examples, the dynamic scheduling processing threshold duration may be based on one or more UE capabilities for UE 115-*i*, a frequency band of operation, a numerology of an active bandwidth part for downlink, uplink, or both, whether a bandwidth part switch is involved, or a combination thereof.

In another example, UE 115-*i* may select a set of RACH preamble occasion and uplink data occasion candidate pairs from multiple configured RACH preamble occasions and uplink data occasions. If UE 115-*i* identifies dynamic scheduling preempting a respective RACH preamble occasion, a respective uplink data occasion, or both for a subset of the multiple RACH preamble occasion and uplink data occasion candidate pairs, UE 115-*i* may remove the subset from the set of RACH preamble occasion and uplink data occasion candidate pairs. In such cases, UE 115-*i* may transmit a RACH message (e.g., a MsgA) on a RACH preamble occasion and an uplink data occasion of a candidate pair that was not removed. In some cases, the selecting may be based on one or more RSRP measurements, one or more link level qualities, one or more UE capabilities, or a combination thereof.

At 640, UE 115-*i* may transmit the RACH message in the configured or selected RACH preamble occasion, the uplink data occasion, or both based on determining when to monitor the downlink control channel. For example, based on monitoring or refraining to monitor the downlink control channel for dynamic scheduling, UE 115-*i* may determine how to transmit the RACH message (e.g., by avoiding collisions with preempting transmissions). The RACH message may include a RACH preamble, an uplink data payload, or both. For example, the RACH message may be a RACH MsgA or a RACH Msg1.

In some cases, UE 115-*i* may receive a configuration message from base station 105-*e* that indicates a set of RACH occasion configurations, where each RACH occasion configuration of the set corresponds to a capability of UE 115-*i* to handle dynamic scheduling. UE 115-*i* may select a RACH occasion configuration of the set of RACH occasion configurations based on the capability of UE 115-*i* to handle the dynamic scheduling and may receive the RRC message or the SI message based on the selected RACH occasion configuration.

In some systems, base station 105-*e* may perform conflict avoidance when dynamically scheduling transmissions (e.g., high-priority transmissions, low-latency transmissions, etc.). For example, base station 105-*e* may avoid preempting RACH preamble occasions and RACH uplink data occasions with dynamic scheduling. In such an example, UE 115-*i* may not monitor the downlink control channel for dynamic scheduling preempting RACH preamble occasions or RACH uplink data occasions based on base station 105-*e* handling the conflict avoidance on the network side. This network-side conflict avoidance may mitigate processing overhead at UE 115-*i* associated with handling conflict avoidance.

In some cases, base station 105-*e* may dynamically switch between implementing conflict avoidance in dynamic scheduling and implementing indications of restricted/non-restricted ROs, POs, or both in RRC signaling. For example, based on a UE's capabilities (e.g., processing capabilities), base station 105-*e* may determine whether to perform conflict avoidance or include the first and second identifiers in an RRC message. In other examples, base station 105-*e* may dynamically select between the schemes based on other parameters, such as priority information, historical channel information (e.g., how often high-priority transmissions are used on the channel), or any other relevant information. Additionally or alternatively, the network may support different cells that implement the different schemes. UE 115-*i* may connect to a particular cell based on the UE's capabilities. For example, a UE 115 that may handle the additional processing for conflict avoidance may connect to a cell that implements indications of the eligibility of restriction for ROs, POs, or both in RRC signaling, while a UE 115 with relatively lower processing capabilities may connect to a cell in which the base station 105 performs conflict avoidance between dynamically scheduled transmissions and the ROs, POs, or both.

Figure 7:
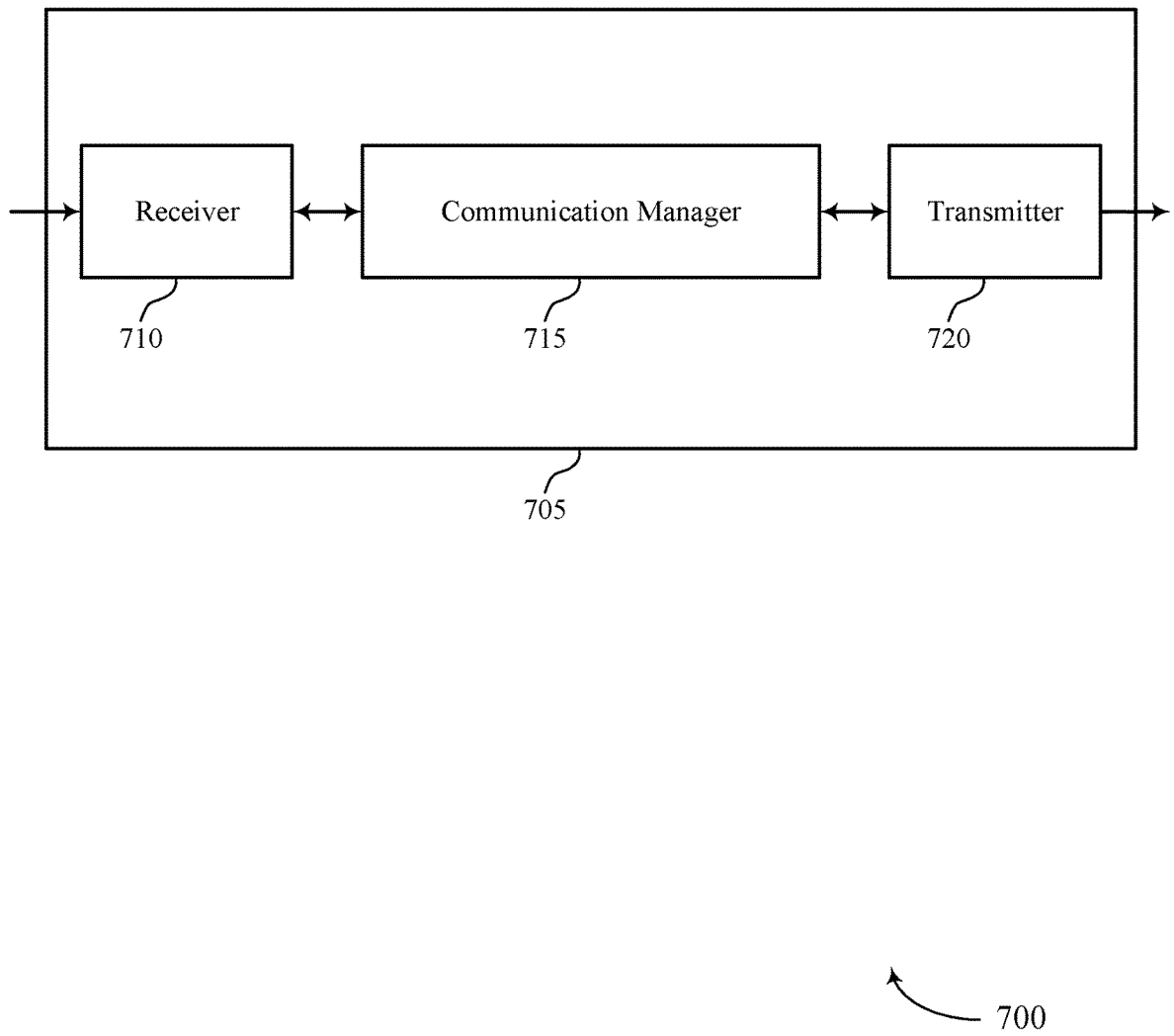
FIGS. 7 and 8 show block diagrams of devices that support handling conflicts between dynamic scheduling and RACH resources in accordance with aspects of the present disclosure.

FIG. 7 shows a block diagram 700 of a device 705 that supports handling conflicts between dynamic scheduling and RACH resources in accordance with aspects of the present disclosure. The device 705 may be an example of aspects of a UE 115 as described herein. The device 705 may include a receiver 710, a communication manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to handling conflicts between dynamic scheduling and RACH resources, etc.). Information may be passed on to other components of the device 705. The receiver 710 may be an example of aspects of the transceiver 1015 described with reference to FIG. 10. The receiver 710 may utilize a single antenna or a set of antennas.

The communication manager 715 may receive a message configuring a resource allocation for at least a RACH preamble occasion and an uplink data occasion, determine if the RACH preamble occasion, the uplink data occasion, or both are restricted for cancellation based on the message, determine when to monitor a downlink control channel based on the determining if the RACH preamble occasion, the uplink data occasion, or both are restricted for cancellation, and transmit a RACH message in the RACH preamble occasion, the uplink data occasion, or both based on the determining when to monitor the downlink control channel. The communication manager 715 may be an example of aspects of the communication manager 1010 described herein.

The actions performed by the communication manager 715 as described herein may be implemented to realize one or more potential advantages. One implementation may support a UE 115 improving the reliability of RACH transmissions while supporting messaging flexibility (e.g., for high priority, low-latency transmissions). For example, determining if the RACH preamble occasion, the uplink data occasion, or both are restricted for cancellation based on the message configuring the occasions and determining when to monitor the downlink control channel for dynamic signaling allows the UE 115 to avoid collisions of RACH transmissions with dynamically scheduled transmissions, while supporting flexible dynamic scheduling at the base station 105. This supports low latency scheduling at the base station 105 for high priority transmissions (e.g., as the base station 105 may preempt some ROs, POs, or both to prioritize latency-sensitive messages).

Based on determining if the RACH preamble occasion, the uplink data occasion, or both are restricted for cancellation according to the message configuring the occasions, a processor of the UE 115 (e.g., controlling the receiver 710, the communication manager 715, and/or the transmitter 720) may reduce processing resources used for a RACH procedure. For example, monitoring the downlink control channel for dynamic scheduling may improve the RACH transmission reliability at the UE 115 by mitigating collisions between RACH messages and dynamically scheduled messages. Additionally or alternatively, determining when—and when not—to monitor the downlink control channel may support efficient processing at the UE 115, as the UE 115 may refrain from monitoring for dynamic scheduling that is unsupported at the base station 105. As such, the UE 115 may reduce the number of RACH retransmissions used to successfully transmit a RACH Msg1 or RACH MsgA and reduce the amount of time monitoring for dynamic scheduling. Reducing the number of retransmissions and the monitoring time may reduce a number of times the processor ramps up processing power and turns on processing units to handle RACH procedures. The reduced number of retransmissions may also reduce overhead on the uplink channel (e.g., in addition to reducing the processing overhead at the processor).

The communication manager 715, or its sub-components, may be implemented in hardware, code (e.g., software or firmware) executed by a processor, or any combination thereof. If implemented in code executed by a processor, the functions of the communication manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communication manager 715, or its sub-components, may be physically located at various positions, including being distributed such that portions of functions are implemented at different physical locations by one or more physical components. In some examples, the communication manager 715, or its sub-components, may be a separate and distinct component in accordance with various aspects of the present disclosure. In some examples, the communication manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1015 described with reference to FIG. 10. The transmitter 720 may utilize a single antenna or a set of antennas.

Figure 8:
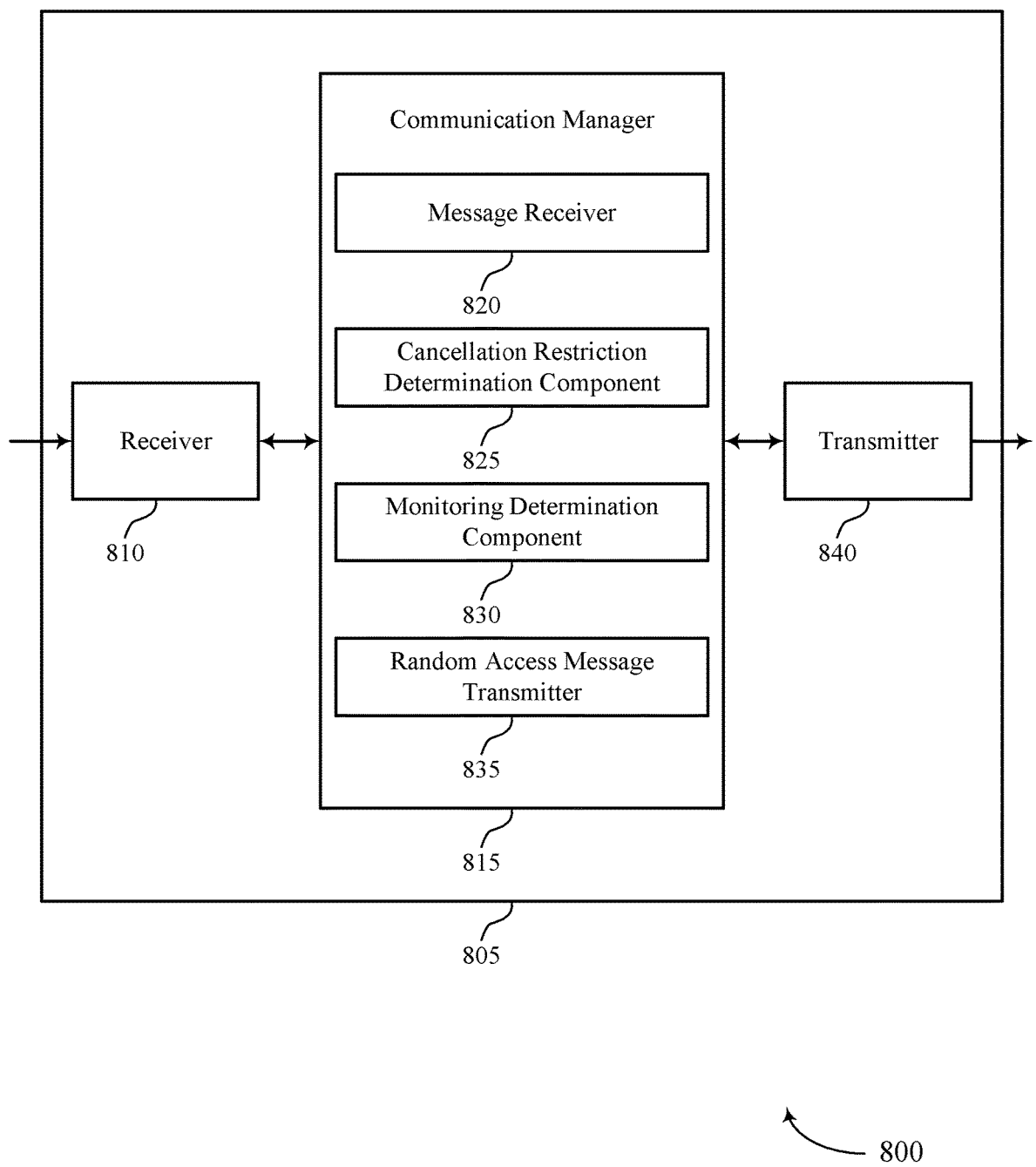

FIG. 8 shows a block diagram 800 of a device 805 that supports handling conflicts between dynamic scheduling and RACH resources in accordance with aspects of the present disclosure. The device 805 may be an example of aspects of a device 705 or a UE 115 as described herein. The device 805 may include a receiver 810, a communication manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to handling conflicts between dynamic scheduling and RACH resources, etc.). Information may be passed on to other components of the device 805. The receiver 810 may be an example of aspects of the transceiver 1015 described with reference to FIG. 10. The receiver 810 may utilize a single antenna or a set of antennas.

The communication manager 815 may be an example of aspects of the communication manager 715 as described herein. The communication manager 815 may include a message receiver 820, a cancellation restriction determination component 825, a monitoring determination component 830, and a random access message transmitter 835. The communication manager 815 may be an example of aspects of the communication manager 1010 described herein.

The message receiver 820 may receive a message configuring a resource allocation for at least a RACH preamble occasion and an uplink data occasion. The cancellation restriction determination component 825 may determine if the RACH preamble occasion, the uplink data occasion, or both are restricted for cancellation based on the message. The monitoring determination component 830 may determine when to monitor a downlink control channel based on the determining if the RACH preamble occasion, the uplink data occasion, or both are restricted for cancellation. The random access message transmitter 835 may transmit a RACH message in the RACH preamble occasion, the uplink data occasion, or both based on the determining when to monitor the downlink control channel.

The actions performed by the cancellation restriction determination component 825, monitoring determination component 830, or both as described herein may be implemented to realize one or more potential advantages. One implementation may support a UE 115 improving the reliability of RACH transmissions while supporting messaging flexibility (e.g., for high priority, low-latency transmissions). For example, determining if the RACH preamble occasion, the uplink data occasion, or both are restricted for cancellation based on the message configuring the occasions and determining when to monitor the downlink control channel for dynamic signaling allows the UE 115 to avoid collisions of RACH transmissions with dynamically scheduled transmissions, while supporting flexible dynamic scheduling at the base station 105. This supports low latency scheduling at the base station 105 for high priority transmissions (e.g., as the base station 105 may preempt some ROs, POs, or both to prioritize latency-sensitive messages).

The transmitter 840 may transmit signals generated by other components of the device 805. In some examples, the transmitter 840 may be collocated with a receiver 810 in a transceiver module. For example, the transmitter 840 may be an example of aspects of the transceiver 1015 described with reference to FIG. 10. The transmitter 840 may utilize a single antenna or a set of antennas.

Figure 9:
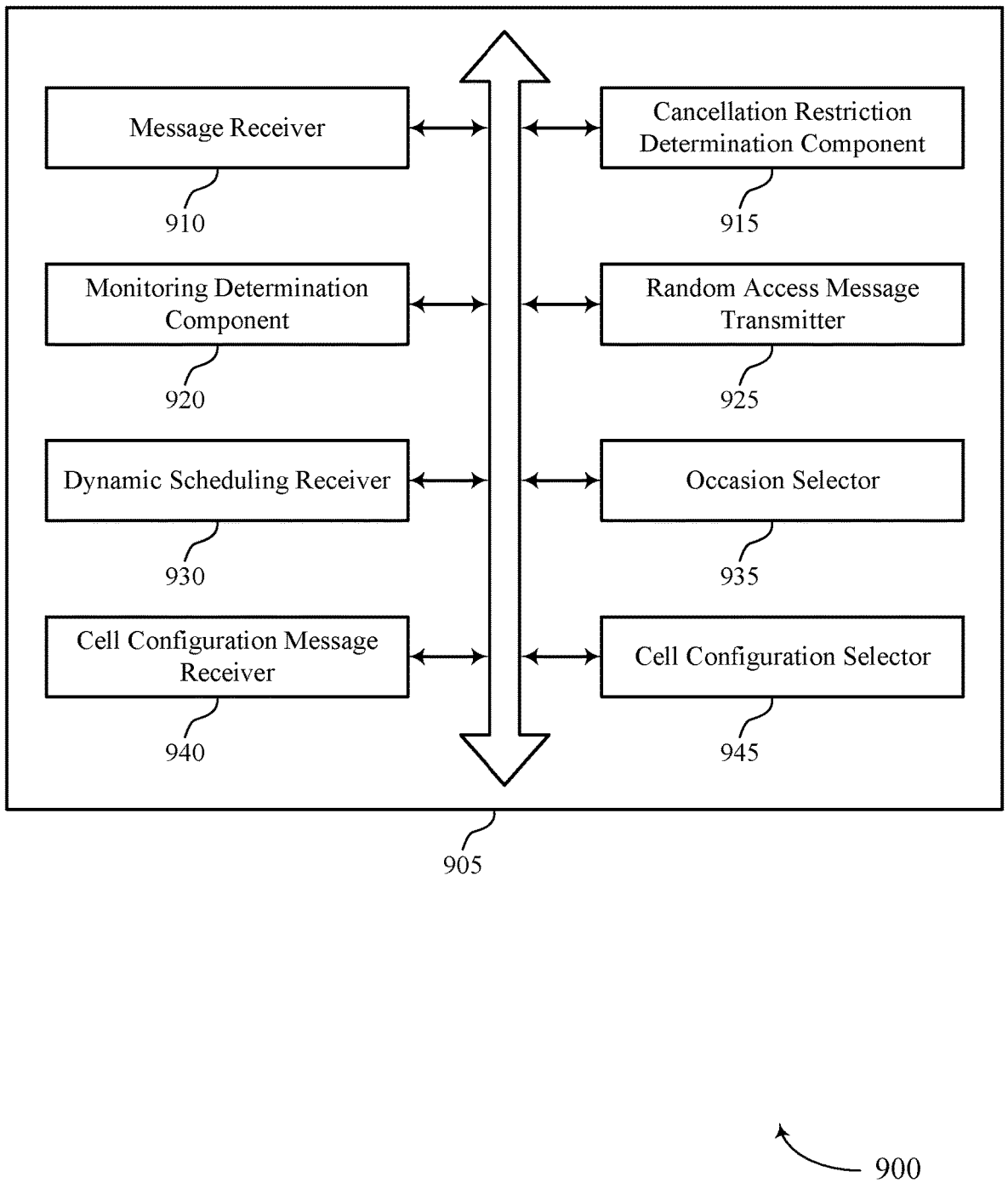
FIG. 9 shows a block diagram of a communication manager that supports handling conflicts between dynamic scheduling and RACH resources in accordance with aspects of the present disclosure.

FIG. 9 shows a block diagram 900 of a communication manager 905 that supports handling conflicts between dynamic scheduling and RACH resources in accordance with aspects of the present disclosure. The communication manager 905 may be an example of aspects of a communication manager 715, a communication manager 815, or a communication manager 1010 described herein. The communication manager 905 may include a message receiver 910, a cancellation restriction determination component 915, a monitoring determination component 920, a random access message transmitter 925, a dynamic scheduling receiver 930, an occasion selector 935, a cell configuration message receiver 940, and a cell configuration selector 945. Each of these modules may communicate, directly or indirectly, with one another (e.g., via one or more buses).

The message receiver 910 may receive a message configuring a resource allocation for at least a RACH preamble occasion and an uplink data occasion. In some examples, the message receiver 910 may receive the message (e.g., an SI message, an RRC message, or both) configuring a set of RACH preamble occasions and a set of uplink data occasions for a configuration period.

The cancellation restriction determination component 915 may determine if the RACH preamble occasion, the uplink data occasion, or both are restricted for cancellation based on the message. In some examples, the message may be an SI message and the message may configure the resource allocation for CBRA. In some examples, the cancellation restriction determination component 915 may determine that the RACH preamble occasion and the uplink data occasion are both restricted for cancellation based on the message being an SI message. In some examples, the message may be an RRC message, and the message may configure the resource allocation for CFRA. In some such examples, the cancellation restriction determination component 915 may determine if the RACH preamble occasion, the uplink data occasion, or both are restricted for cancellation based on a first indicator for RACH preamble occasion restriction and a second indicator for uplink data occasion restriction for the RRC message. In some cases, the first indicator, the second indicator, or both include one-bit or multi-bit flags.

In some cases, the determining if the RACH preamble occasion, the uplink data occasion, or both are restricted for cancellation includes determining that the RACH preamble occasion and the uplink data occasion are both restricted for cancellation. In some cases, the determining if the RACH preamble occasion, the uplink data occasion, or both are restricted for cancellation includes determining that the RACH preamble occasion is restricted for cancellation. In some cases, the determining if the RACH preamble occasion, the uplink data occasion, or both are restricted for cancellation includes determining that the RACH preamble occasion is restricted for cancellation and the uplink data occasion is non-restricted for cancellation. In some cases, the determining if the RACH preamble occasion, the uplink data occasion, or both are restricted for cancellation includes determining that the RACH preamble occasion is non-restricted for cancellation.

The monitoring determination component 920 may determine when to monitor a downlink control channel based on the determining if the RACH preamble occasion, the uplink data occasion, or both are restricted for cancellation. In some examples, the monitoring determination component 920 may monitor the downlink control channel for the dynamic scheduling of a dynamic SFI, a dynamic grant, or both preempting the uplink data occasion, where the downlink control channel corresponds to a common search space or a UE-specific search space and transmitting a RACH message is based on the monitoring. In some examples, the monitoring determination component 920 may monitor the downlink control channel for the dynamic scheduling of a dynamic SFI, a dynamic grant, or both preempting the RACH preamble occasion, the uplink data occasion, or both, where the downlink control channel corresponds to a common search space or a UE-specific search space and the transmitting the RACH message is based on the monitoring. In some cases, the determining when to monitor the downlink control channel includes determining to monitor the downlink control channel for dynamic scheduling preempting the uplink data occasion based on the uplink data occasion being non-restricted for cancellation. In some cases, the determining when to monitor the downlink control channel includes determining to monitor the downlink control channel for dynamic scheduling preempting the RACH preamble occasion, the uplink data occasion, or both based on the RACH preamble occasion being non-restricted for cancellation.

In some cases, the downlink control channel may be monitored up to a threshold time preceding the uplink data occasion by a dynamic scheduling processing threshold duration, where the dynamic scheduling processing threshold duration is based on one or more UE capabilities, a frequency band of operation, a numerology of an active bandwidth part for downlink, uplink, or both, whether a bandwidth part switch is involved, or a combination thereof.

In some other cases, the downlink control channel may be monitored up to a threshold time preceding the RACH preamble occasion by a dynamic scheduling processing threshold duration, where the dynamic scheduling processing threshold duration is based on one or more UE capabilities, a frequency band of operation, a numerology of an active bandwidth part for downlink, uplink, or both, whether a bandwidth part switch is involved, or a combination thereof.

The random access message transmitter 925 may transmit a RACH message in the RACH preamble occasion, the uplink data occasion, or both based on the determining when to monitor the downlink control channel. In some examples, the transmitting may involve the random access message transmitter 925 transmitting, in the RACH preamble occasion, a RACH preamble message and refraining from transmitting, in the uplink data occasion, an uplink data message based on the determining if the RACH preamble occasion, the uplink data occasion, or both are restricted for cancellation. In some cases, determining when to monitor the downlink control channel includes determining to refrain from monitoring the downlink control channel for dynamic scheduling preempting the RACH preamble occasion, the uplink data occasion, or both based on the RACH preamble occasion and the uplink data occasion both being restricted for cancellation. In some cases, the transmitting includes transmitting, in the RACH preamble occasion, a RACH Msg1 in a four-step random access procedure, where the determining when to monitor the downlink control channel includes determining to refrain from monitoring the downlink control channel for dynamic scheduling preempting the RACH preamble occasion, the uplink data occasion, or both based on the RACH preamble occasion being restricted for cancellation and transmitting a RACH Msg1 (e.g., as opposed to a RACH MsgA).

In some examples, the RACH message may be a RACH MsgA. The random access message transmitter 925 may transmit, in the RACH preamble occasion, a RACH preamble for the RACH MsgA. In some examples, the random access message transmitter 925 may transmit, in the uplink data occasion, an uplink data payload for the RACH MsgA based on the monitoring. In some examples, the random access message transmitter 925 may transmit, in the RACH preamble occasion, a RACH preamble for the RACH MsgA based on the monitoring (e.g., without transmitting an uplink data payload in the uplink data occasion based on the monitoring).

The dynamic scheduling receiver 930 may receive a dynamic SFI, a dynamic grant, or both. In some cases, the dynamic scheduling receiver 930 may receive the dynamic SFI, the dynamic grant, or both preempting the uplink data occasion based on the monitoring, where the transmitting includes transmitting, in the RACH preamble occasion, a RACH preamble message and refraining from transmitting, in the uplink data occasion, an uplink data message based on the receiving. In some cases, the dynamic scheduling receiver 930 may receive the dynamic SFI, the dynamic grant, or both preempting the RACH preamble occasion based on the monitoring, where the transmitting includes refraining from transmitting the RACH message in the RACH preamble occasion and the uplink data occasion based on the receiving and instead transmitting the RACH message in a subsequent RACH preamble occasion, a subsequent uplink data occasion, or both based on the receiving.

In some examples, the message receiver 910 may receive the message (e.g., an SI message, an RRC message, or both) configuring a set of RACH preamble occasions and a set of uplink data occasions for a configuration period. In some cases, the occasion selector 935 may select the RACH preamble occasion from the set of RACH preamble occasions and the uplink data occasion from the set of uplink data occasions. The selecting may be based on one or more RSRP measurements, one or more link level qualities, one or more UE capabilities, or a combination thereof. In some other cases, the occasion selector 935 may select a set of RACH preamble occasion and uplink data occasion candidate pairs from the set of RACH preamble occasions and the set of uplink data occasions. In some such other cases, the monitoring determination component 920 may identify dynamic scheduling preempting a respective RACH preamble occasion, a respective uplink data occasion, or both for a subset of the set of RACH preamble occasion and uplink data occasion candidate pairs. The occasion selector 935 may remove the subset of the set of RACH preamble occasion and uplink data occasion candidate pairs from the set of RACH preamble occasion and uplink data occasion candidate pairs, where the RACH message is transmitted in the RACH preamble occasion, the uplink data occasion, or both for a RACH preamble occasion and uplink data occasion candidate pair remaining in the set of RACH preamble occasion and uplink data occasion candidate pairs following the removing.

The cell configuration message receiver 940 may receive a configuration message indicating a set of RACH occasion configurations, where each RACH occasion configuration of the set of RACH occasion configurations corresponds to a capability of the UE to handle dynamic scheduling.

The cell configuration selector 945 may select a RACH occasion configuration of the set of RACH occasion configurations based on the capability of the UE to handle the dynamic scheduling, where the message is received based on the selected RACH occasion configuration.

The actions performed by the cancellation restriction determination component 915, monitoring determination component 920, or both as described herein may be implemented to realize one or more potential advantages. One implementation may support a UE 115 improving the reliability of RACH transmissions while supporting messaging flexibility (e.g., for high priority, low-latency transmissions). For example, determining if the RACH preamble occasion, the uplink data occasion, or both are restricted for cancellation based on the message configuring the occasions and determining when to monitor the downlink control channel for dynamic signaling allows the UE 115 to avoid collisions of RACH transmissions with dynamically scheduled transmissions, while supporting flexible dynamic scheduling at the base station 105. This supports low latency scheduling at the base station 105 for high priority transmissions (e.g., as the base station 105 may preempt some ROs, POs, or both to prioritize latency-sensitive messages).

Figure 10:
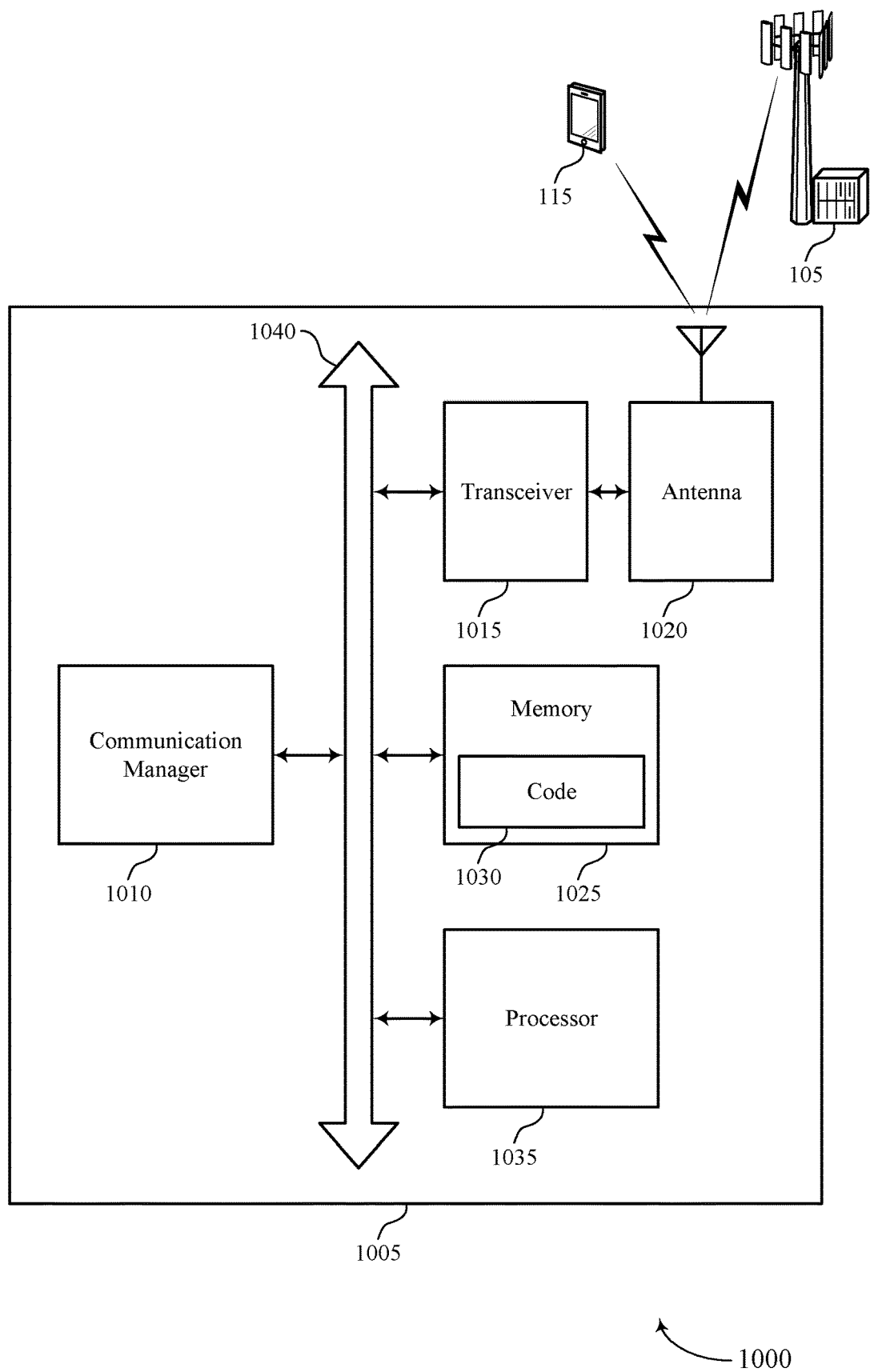
FIG. 10 shows a diagram of a system including a device that supports handling conflicts between dynamic scheduling and RACH resources in accordance with aspects of the present disclosure.

FIG. 10 shows a diagram of a system 1000 including a device 1005 that supports handling conflicts between dynamic scheduling and RACH resources in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communication manager 1010, a transceiver 1015, an antenna 1020, memory 1025, and a processor 1035. These components may be in electronic communication via one or more buses (e.g., bus 1040).

The communication manager 1010 may receive a message configuring a resource allocation for at least a RACH preamble occasion and an uplink data occasion, determine if the RACH preamble occasion, the uplink data occasion, or both are restricted for cancellation based on the message, determine when to monitor a downlink control channel based on the determining if the RACH preamble occasion, the uplink data occasion, or both are restricted for cancellation, and transmit a RACH message in the RACH preamble occasion, the uplink data occasion, or both based on the determining when to monitor the downlink control channel.

The transceiver 1015 may communicate bi-directionally, via one or more antennas, wired, or wireless links as described above. For example, the transceiver 1015 may represent a wireless transceiver and may communicate bi-directionally with another wireless transceiver. The transceiver 1015 may also include a modem to modulate the packets and provide the modulated packets to the antennas for transmission, and to demodulate packets received from the antennas.

In some cases, the wireless device may include a single antenna 1020. However, in some cases the device may have more than one antenna 1020, which may be capable of concurrently transmitting or receiving multiple wireless transmissions.

The memory 1025 may include random-access memory (RAM) and read-only memory (ROM). The memory 1025 may store computer-readable, computer-executable code 1030 including instructions that, when executed, cause the processor to perform various functions described herein. In some cases, the memory 1025 may contain, among other things, a basic I/O system (BIOS) which may control basic hardware or software operation such as the interaction with peripheral components or devices.

The code 1030 may include instructions to implement aspects of the present disclosure, including instructions to support wireless communications. The code 1030 may be stored in a non-transitory computer-readable medium such as system memory or other type of memory. In some cases, the code 1030 may not be directly executable by the processor 1035 but may cause a computer (e.g., when compiled and executed) to perform functions described herein.

The processor 1035 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1035 may be configured to operate a memory array using a memory controller. In other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting handling conflicts between dynamic scheduling and RACH resources).

Figure 11:
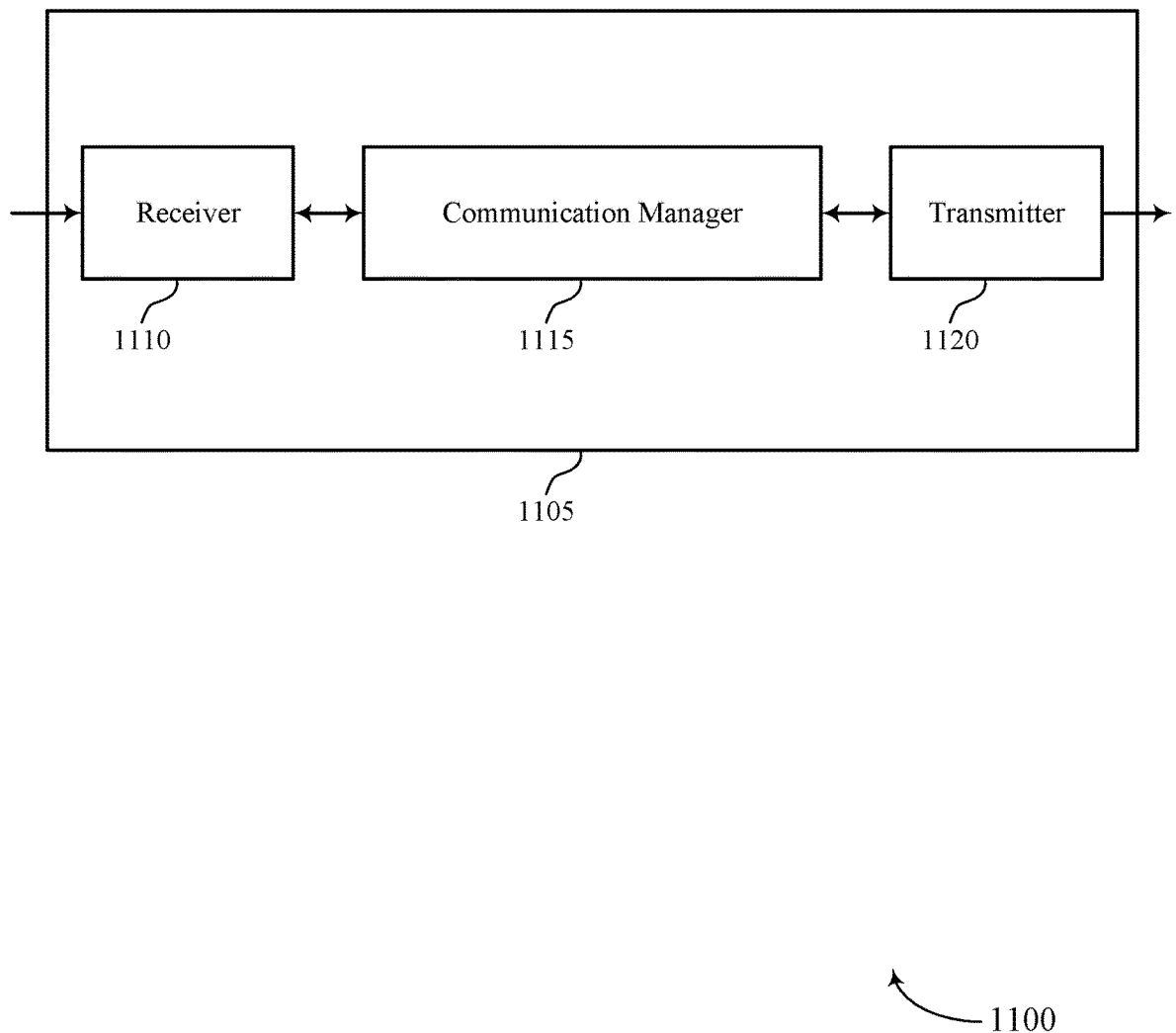
FIGS. 11 and 12 show block diagrams of devices that support handling conflicts between dynamic scheduling and RACH resources in accordance with aspects of the present disclosure.

FIG. 11 shows a block diagram 1100 of a device 1105 that supports handling conflicts between dynamic scheduling and RACH resources in accordance with aspects of the present disclosure. The device 1105 may be an example of aspects of a base station 105 as described herein. The device 1105 may include a receiver 1110, a communication manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to handling conflicts between dynamic scheduling and RACH resources, etc.). Information may be passed on to other components of the device 1105. The receiver 1110 may be an example of aspects of the transceiver 1420 described with reference to FIG. 14. The receiver 1110 may utilize a single antenna or a set of antennas.

In some cases, the communication manager 1115 may determine a RACH preamble occasion and an uplink data occasion for a RACH message transmission by a UE, generate an RRC message to indicate the RACH preamble occasion and the uplink data occasion, where the RRC message includes a first indicator indicating whether the RACH preamble occasion is restricted for cancellation and a second indicator indicating whether the uplink data occasion is restricted for cancellation, and transmit, to the UE, the generated RRC message. Additionally or alternatively, the communication manager 1115 may transmit, to a UE, a message configuring a RACH preamble occasion and an uplink data occasion for a RACH message transmission by the UE, dynamically schedule a resource for a downlink or uplink message corresponding to a first priority value greater than a second priority value for the RACH message transmission by the UE, where the resource is scheduled based on the RACH preamble occasion and the uplink data occasion to avoid a scheduling conflict between the resource and the RACH preamble occasion and the uplink data occasion, and transmit a dynamic SFI, a dynamic grant, or both indicating the resource for the downlink or uplink message. The communication manager 1115 may be an example of aspects of the communication manager 1410 described herein.

The actions performed by the communication manager 1115 as described herein may be implemented to realize one or more potential advantages. One implementation may support a base station 105 improving the reliability of RACH reception while supporting messaging flexibility (e.g., for high priority, low-latency transmissions). For example, indicating whether RACH preamble occasions, uplink data occasions, or both are restricted for cancellation allows the UEs 115 to avoid collisions of RACH transmissions with dynamically scheduled transmissions, while supporting flexible dynamic scheduling at the base station 105. This supports low latency scheduling at the base station 105 for high priority transmissions (e.g., as the base station 105 may preempt some ROs, POs, or both to prioritize latency-sensitive messages). Another implementation may support a base station 105 improving the reliability of RACH procedures without affecting the processing overhead at UEs 115. For example, performing dynamic scheduling by avoiding a scheduling conflict between dynamically scheduled resources and configured RACH preamble occasions, uplink data occasions, or both may allow the UEs 115 to avoid collisions of RACH transmissions with dynamically scheduled transmissions without the UEs 115 monitoring the downlink control channel for dynamic scheduling.

Based on indicating whether RACH preamble occasions, uplink data occasions, or both are restricted for cancellation, a processor of the base station 105 (e.g., controlling the receiver 1110, the communication manager 1115, and/or the transmitter 1120) may reduce processing resources used for a RACH procedure. For example, these indications may improve the RACH transmission reliability at a UE 115 by mitigating collisions between RACH messages and dynamically scheduled messages. As such, the UE 115 may reduce the number of RACH retransmissions used to successfully transmit a RACH Msg1 or RACH MsgA. Reducing the number of retransmissions may reduce a number of times the processor ramps up processing power and turns on processing units to handle RACH procedures. The reduced number of retransmissions may also reduce overhead on the uplink channel (e.g., in addition to reducing the processing overhead at the processor).

The communication manager 1115, or its sub-components, may be implemented in hardware, code (e.g., software or firmware) executed by a processor, or any combination thereof. If implemented in code executed by a processor, the functions of the communication manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communication manager 1115, or its sub-components, may be physically located at various positions, including being distributed such that portions of functions are implemented at different physical locations by one or more physical components. In some examples, the communication manager 1115, or its sub-components, may be a separate and distinct component in accordance with various aspects of the present disclosure. In some examples, the communication manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
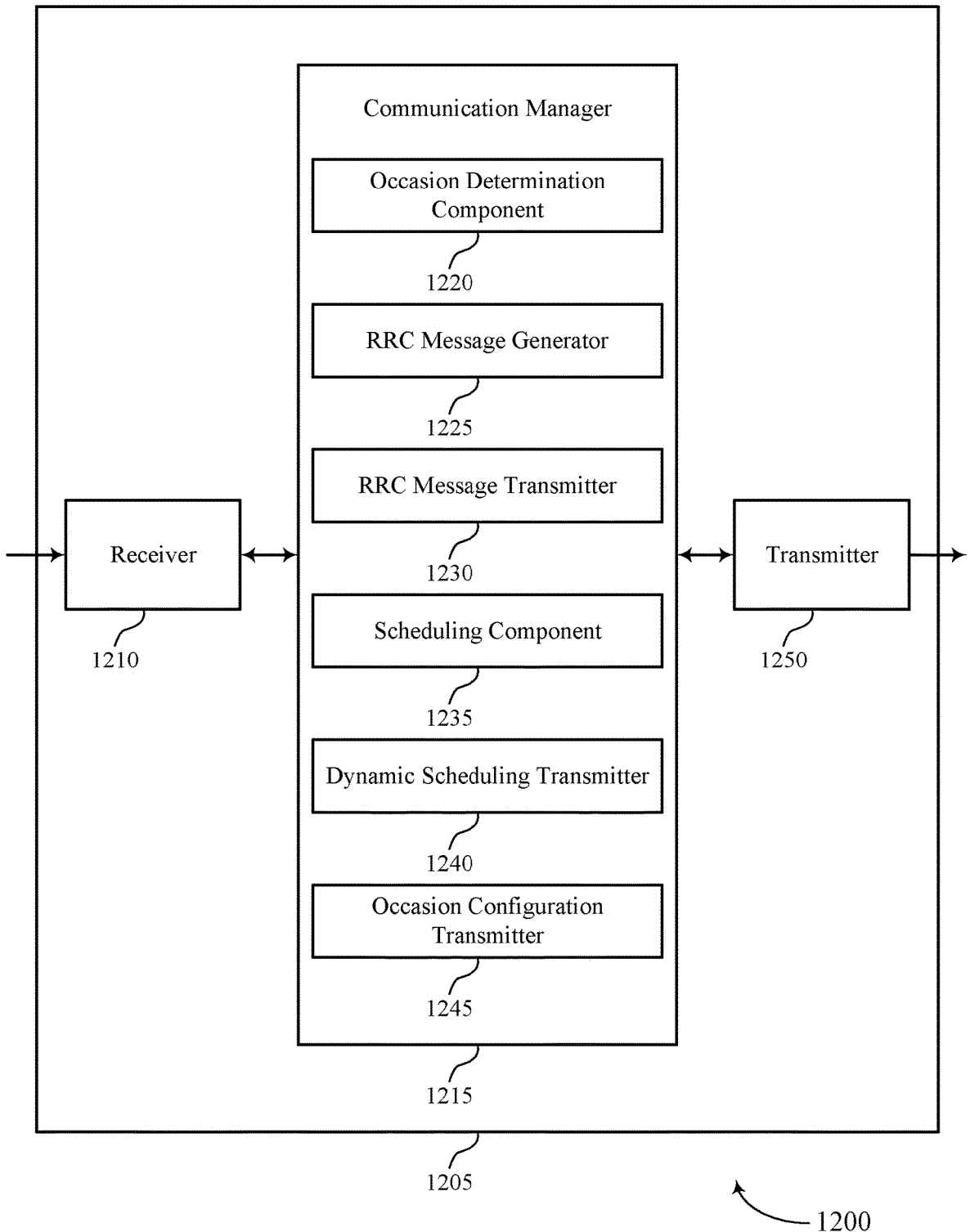

FIG. 12 shows a block diagram 1200 of a device 1205 that supports handling conflicts between dynamic scheduling and RACH resources in accordance with aspects of the present disclosure. The device 1205 may be an example of aspects of a device 1105 or a base station 105 as described herein. The device 1205 may include a receiver 1210, a communication manager 1215, and a transmitter 1250. The device 1205 may also include a processor. Each of these components may be in communication with one another (e.g., via one or more buses).

The receiver 1210 may receive information such as packets, user data, or control information associated with various information channels (e.g., control channels, data channels, and information related to handling conflicts between dynamic scheduling and RACH resources, etc.). Information may be passed on to other components of the device 1205. The receiver 1210 may be an example of aspects of the transceiver 1420 described with reference to FIG. 14. The receiver 1210 may utilize a single antenna or a set of antennas.

The communication manager 1215 may be an example of aspects of the communication manager 1115 as described herein. The communication manager 1215 may include an occasion determination component 1220, an RRC message generator 1225, an RRC message transmitter 1230, a scheduling component 1235, a dynamic scheduling transmitter 1240, an occasion configuration transmitter 1245, or a combination thereof. The communication manager 1215 may be an example of aspects of the communication manager 1410 described herein.

In some cases, the occasion determination component 1220 may determine a RACH preamble occasion and an uplink data occasion for a RACH message transmission by a UE. The RRC message generator 1225 may generate an RRC message to indicate the RACH preamble occasion and the uplink data occasion, where the RRC message includes a first indicator indicating whether the RACH preamble occasion is restricted for cancellation and a second indicator indicating whether the uplink data occasion is restricted for cancellation. The RRC message transmitter 1230 may transmit, to the UE, the generated RRC message.

Additionally or alternatively, the occasion configuration transmitter 1245 may transmit, to a UE, a message configuring a RACH preamble occasion and an uplink data occasion for a RACH message transmission by the UE. The scheduling component 1235 may dynamically schedule a resource for a downlink or uplink message corresponding to a first priority value greater than a second priority value for the RACH message transmission by the UE, where the resource is scheduled based on the RACH preamble occasion and the uplink data occasion to avoid a scheduling conflict between the resource and the RACH preamble occasion and the uplink data occasion. The dynamic scheduling transmitter 1240 may transmit a dynamic SFI, a dynamic grant, or both indicating the resource for the downlink or uplink message.

The actions performed by the occasion determination component 1220, the RRC message generator 1225, the RRC message transmitter 1230, the scheduling component 1235, the dynamic scheduling transmitter 1240, the occasion configuration transmitter 1245, or any combination thereof as described herein may be implemented to realize one or more potential advantages. One implementation may support a base station 105 improving the reliability of RACH reception while supporting messaging flexibility (e.g., for high priority, low-latency transmissions). For example, indicating whether RACH preamble occasions, uplink data occasions, or both are restricted for cancellation allows the UEs 115 to avoid collisions of RACH transmissions with dynamically scheduled transmissions, while supporting flexible dynamic scheduling at the base station 105. This supports low latency scheduling at the base station 105 for high priority transmissions (e.g., as the base station 105 may preempt some ROs, POs, or both to prioritize latency-sensitive messages). Another implementation may support a base station 105 improving the reliability of RACH procedures without affecting the processing overhead at UEs 115. For example, performing dynamic scheduling by avoiding a scheduling conflict between dynamically scheduled resources and configured RACH preamble occasions, uplink data occasions, or both may allow the UEs 115 to avoid collisions of RACH transmissions with dynamically scheduled transmissions without the UEs 115 monitoring the downlink control channel for dynamic scheduling.

The transmitter 1250 may transmit signals generated by other components of the device 1205. In some examples, the transmitter 1250 may be collocated with a receiver 1210 in a transceiver module. For example, the transmitter 1250 may be an example of aspects of the transceiver 1420 described with reference to FIG. 14. The transmitter 1250 may utilize a single antenna or a set of antennas.

Figure 13:
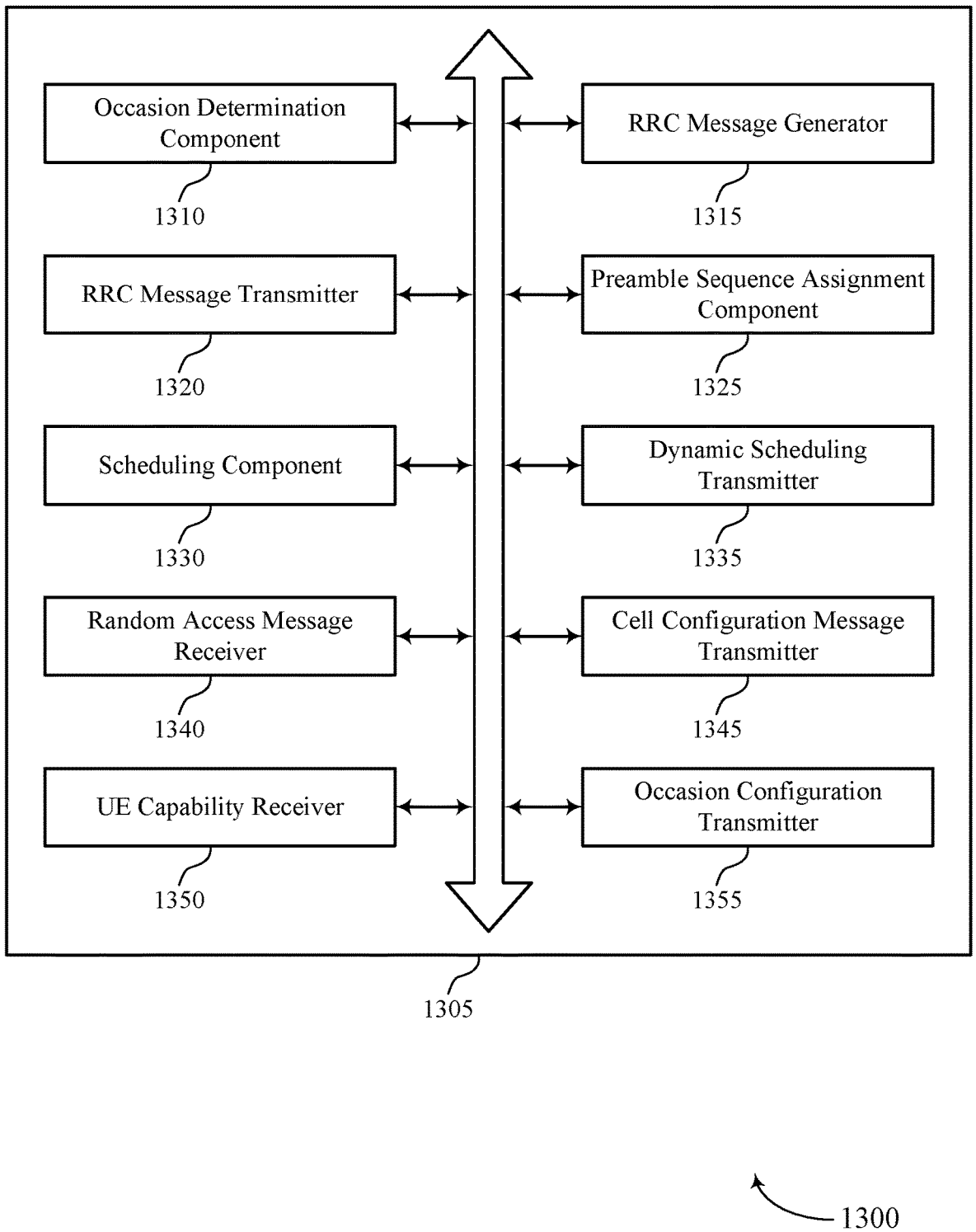
FIG. 13 shows a block diagram of a communication manager that supports handling conflicts between dynamic scheduling and RACH resources in accordance with aspects of the present disclosure.

FIG. 13 shows a block diagram 1300 of a communication manager 1305 that supports handling conflicts between dynamic scheduling and RACH resources in accordance with aspects of the present disclosure. The communication manager 1305 may be an example of aspects of a communication manager 1115, a communication manager 1215, or a communication manager 1410 described herein. The communication manager 1305 may include an occasion determination component 1310, an RRC message generator 1315, an RRC message transmitter 1320, a preamble sequence assignment component 1325, a scheduling component 1330, a dynamic scheduling transmitter 1335, a random access message receiver 1340, a cell configuration message transmitter 1345, a UE capability receiver 1350, and an occasion configuration transmitter 1355. Each of these modules may communicate, directly or indirectly, with one another (e.g., via one or more buses).

The occasion determination component 1310 may determine a RACH preamble occasion and an uplink data occasion for a RACH message transmission by a UE.

The RRC message generator 1315 may generate an RRC message to indicate the RACH preamble occasion and the uplink data occasion, where the RRC message includes a first indicator indicating whether the RACH preamble occasion is restricted for cancellation and a second indicator indicating whether the uplink data occasion is restricted for cancellation. In some cases, the first indicator, the second indicator, or both are one-bit or multi-bit flags. In some examples, the RRC message generator 1315 may determine to generate the RRC message including the first indicator and the second indicator based on a UE capability. In some examples, the RRC message generator 1315 may configure an additional UE for a cell that supports conflict avoidance between dynamically scheduled resources and RACH preamble occasions and uplink data occasions based on the UE capability. In some cases, the RRC message indicates a set of RACH preamble occasions and a set of uplink data occasions, and where the RRC message includes a set of first indicators indicating whether respective RACH preamble occasions of the set of RACH preamble occasions are restricted for cancellation and a set of second indicators indicating whether respective uplink data occasions of the set of uplink data occasions are restricted for cancellation.

The RRC message transmitter 1320 may transmit, to the UE, the generated RRC message. In some examples, the RRC message transmitter 1320 may transmit, to the additional UE, a message configuring an additional RACH preamble occasion and an additional uplink data occasion for an additional RACH message transmission by the additional UE.

The preamble sequence assignment component 1325 may assign one or more CFRA preamble sequences to the RACH preamble occasion, where the RACH preamble occasion is restricted for cancellation based on the assigned one or more CFRA preamble sequences.

In some examples, the first indicator indicates that the RACH preamble occasion is restricted for cancellation. The scheduling component 1330 may dynamically schedule a resource for a downlink or uplink message corresponding to a first priority value greater than a second priority value for the RACH message transmission by the UE, where the resource is scheduled based on the RACH preamble occasion to avoid a scheduling conflict between the resource and the RACH preamble occasion. In some other examples, the second indicator indicates that the uplink data occasion is restricted for cancellation. The scheduling component 1330 may dynamically schedule a resource for a downlink or uplink message corresponding to a first priority value greater than a second priority value for the RACH message transmission by the UE, where the resource is scheduled based on the uplink data occasion to avoid a scheduling conflict between the resource and the uplink data occasion.

In some examples, the first indicator indicates that the RACH preamble occasion is non-restricted for cancellation and the scheduling component 1330 may dynamically schedule a resource for a downlink or uplink message corresponding to a first priority value greater than a second priority value for the RACH message transmission by the UE, where the resource preempts the RACH preamble occasion. In some examples, the second indicator indicates that the uplink data occasion is non-restricted for cancellation and the scheduling component 1330 may dynamically schedule a resource for a downlink or uplink message corresponding to a first priority value greater than a second priority value for the RACH message transmission by the UE, where the resource preempts the uplink data occasion. In some examples, the scheduling component 1330 may dynamically schedule a resource for a downlink or uplink message corresponding to a first priority value greater than a second priority value for the additional RACH message transmission by the additional UE, where the resource is scheduled based on the additional RACH preamble occasion and the additional uplink data occasion to avoid a scheduling conflict between the resource and the additional RACH preamble occasion and the additional uplink data occasion based on the UE capability.

In some examples, the dynamic scheduling transmitter 1335 may transmit a dynamic SFI, a dynamic grant, or both indicating the resource for the downlink or uplink message.

The random access message receiver 1340 may receive, from the UE, a RACH preamble in the RACH preamble occasion based on the generated RRC message.

The cell configuration message transmitter 1345 may transmit, to the UE, a configuration message indicating a set of RACH occasion configurations, where each RACH occasion configuration of the set of RACH occasion configurations corresponds to a UE capability for handling dynamic scheduling.

The UE capability receiver 1350 may receive a UE capability for the UE. In some examples, the UE capability receiver 1350 may receive a UE capability for an additional UE.

The occasion configuration transmitter 1355 may transmit, to a UE, a message configuring a RACH preamble occasion and an uplink data occasion for a RACH message transmission by the UE. The scheduling component 1330 may dynamically schedule a resource for a downlink or uplink message corresponding to a first priority value greater than a second priority value for the RACH message transmission by the UE, where the resource is scheduled based on the RACH preamble occasion and the uplink data occasion to avoid a scheduling conflict between the resource and the RACH preamble occasion and the uplink data occasion. The dynamic scheduling transmitter 1335 may transmit a dynamic SFI, a dynamic grant, or both indicating the resource for the downlink or uplink message.

The actions performed by the occasion determination component 1310, the RRC message generator 1315, the RRC message transmitter 1320, the scheduling component 1330, the dynamic scheduling transmitter 1335, the occasion configuration transmitter 1355, or any combination thereof as described herein may be implemented to realize one or more potential advantages. One implementation may support a base station 105 improving the reliability of RACH reception while supporting messaging flexibility (e.g., for high priority, low-latency transmissions). For example, indicating whether RACH preamble occasions, uplink data occasions, or both are restricted for cancellation allows the UEs 115 to avoid collisions of RACH transmissions with dynamically scheduled transmissions, while supporting flexible dynamic scheduling at the base station 105. This supports low latency scheduling at the base station 105 for high priority transmissions (e.g., as the base station 105 may preempt some ROs, POs, or both to prioritize latency-sensitive messages). Another implementation may support a base station 105 improving the reliability of RACH procedures without affecting the processing overhead at UEs 115. For example, performing dynamic scheduling by avoiding a scheduling conflict between dynamically scheduled resources and configured RACH preamble occasions, uplink data occasions, or both may allow the UEs 115 to avoid collisions of RACH transmissions with dynamically scheduled transmissions without the UEs 115 monitoring the downlink control channel for dynamic scheduling.

Figure 14:
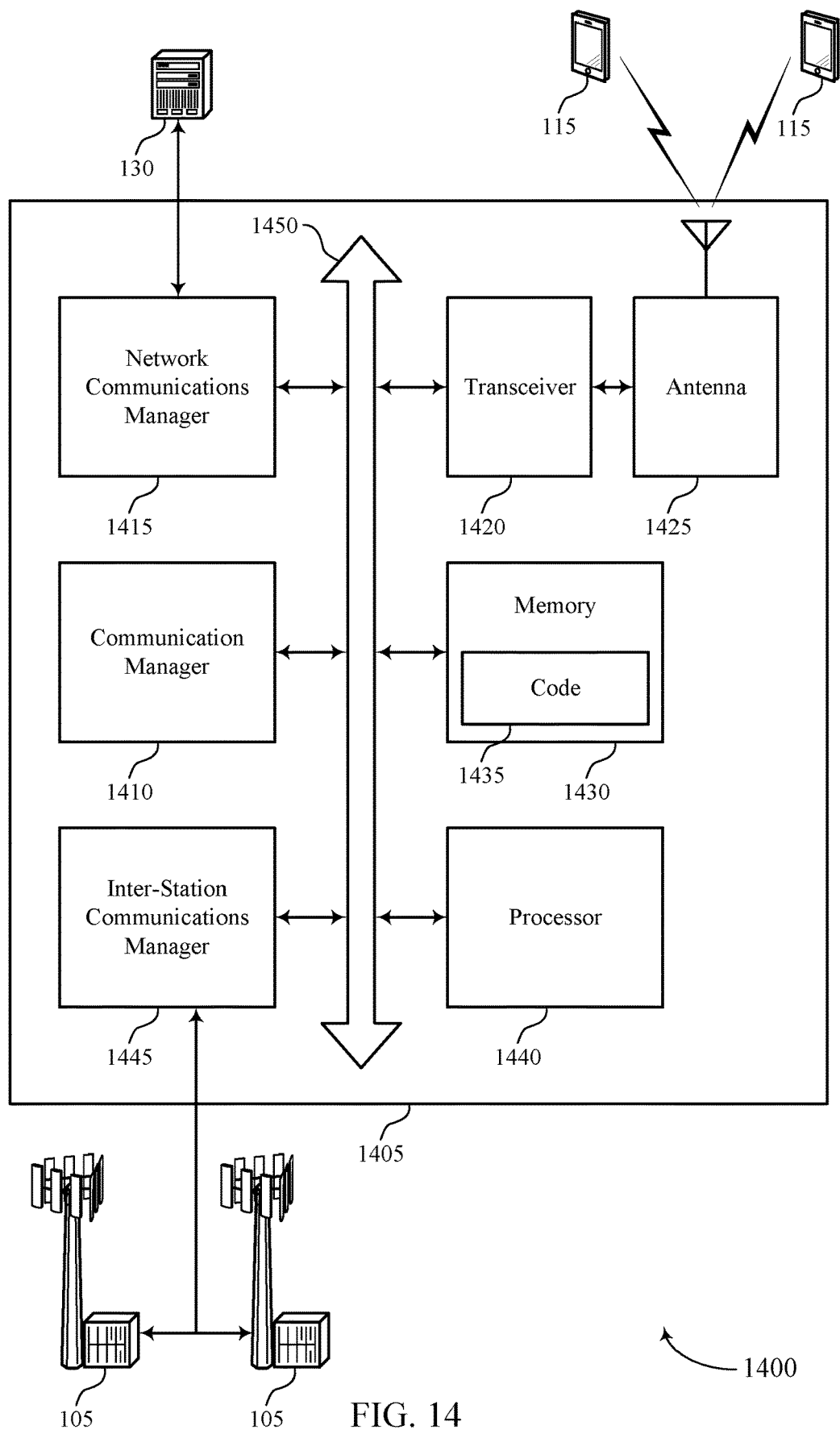
FIG. 14 shows a diagram of a system including a device that supports handling conflicts between dynamic scheduling and RACH resources in accordance with aspects of the present disclosure.

FIG. 14 shows a diagram of a system 1400 including a device 1405 that supports handling conflicts between dynamic scheduling and RACH resources in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communication manager 1410, a network communications manager 1415, a transceiver 1420, an antenna 1425, a memory 1430, a processor 1440, and an inter-station communications manager 1445. These components may be in electronic communication via one or more buses (e.g., bus 1450).

In some cases, the communication manager 1410 may determine a RACH preamble occasion and an uplink data occasion for a RACH message transmission by a UE, generate an RRC message to indicate the RACH preamble occasion and the uplink data occasion, where the RRC message includes a first indicator indicating whether the RACH preamble occasion is restricted for cancellation and a second indicator indicating whether the uplink data occasion is restricted for cancellation, and transmit, to the UE, the generated RRC message. Additionally or alternatively, the communication manager 1410 may transmit, to a UE, a message configuring a RACH preamble occasion and an uplink data occasion for a RACH message transmission by the UE, dynamically schedule a resource for a downlink or uplink message corresponding to a first priority value greater than a second priority value for the RACH message transmission by the UE, where the resource is scheduled based on the RACH preamble occasion and the uplink data occasion to avoid a scheduling conflict between the resource and the RACH preamble occasion and the uplink data occasion, and transmit a dynamic SFI, a dynamic grant, or both indicating the resource for the downlink or uplink message.

The network communications manager 1415 may manage communications with the core network 130 (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM and ROM. The memory 1430 may store computer-readable, computer-executable code 1435 including instructions that, when executed, cause the processor to perform various functions described herein. In some cases, the memory 1430 may contain, among other things, a BIOS which may control basic hardware or software operation such as the interaction with peripheral components or devices.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting handling conflicts between dynamic scheduling and RACH resources).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
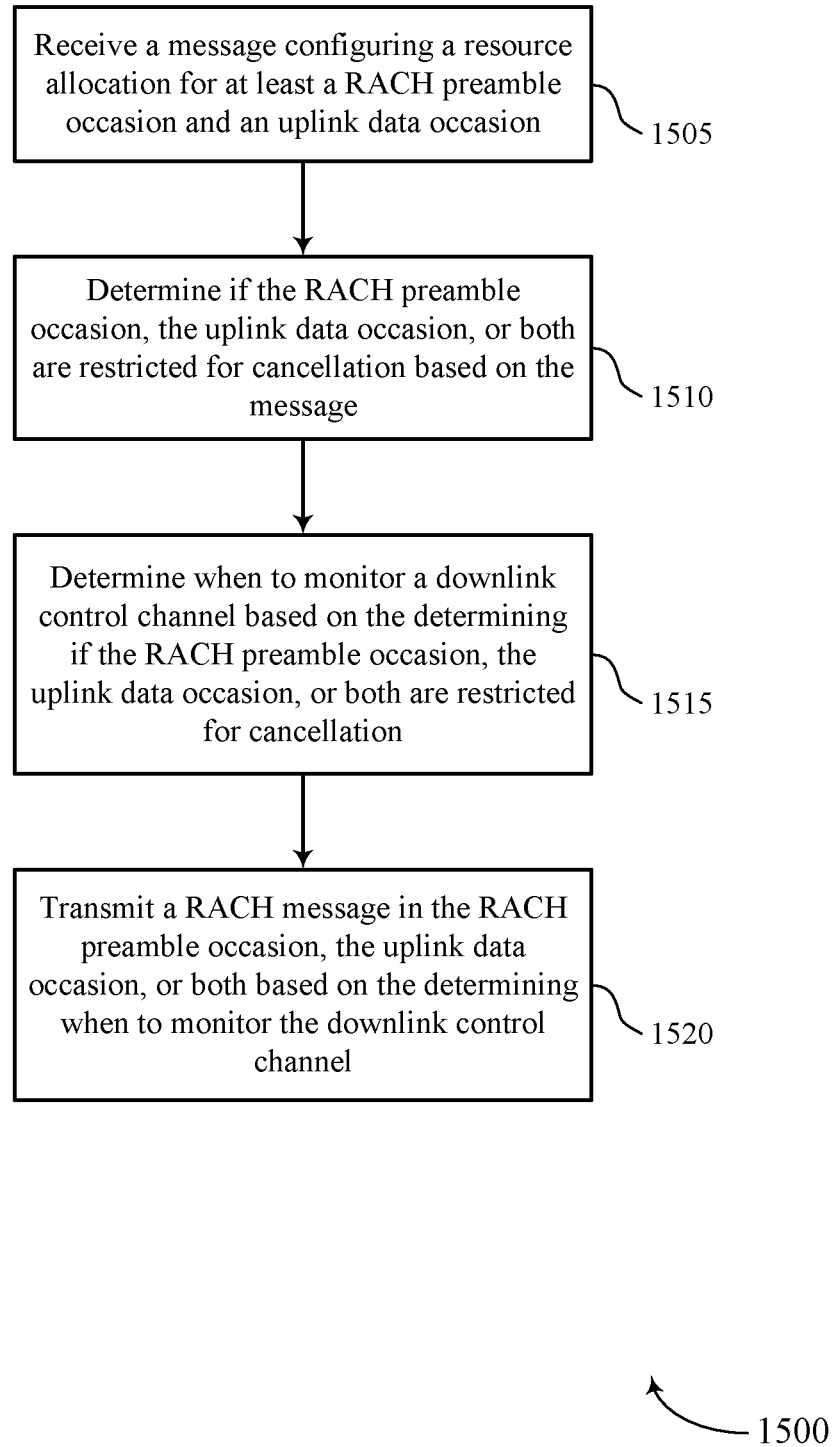
FIGS. 15 through 20 show flowcharts illustrating methods that support handling conflicts between dynamic scheduling and RACH resources in accordance with aspects of the present disclosure.

FIG. 15 shows a flowchart illustrating a method 1500 that supports handling conflicts between dynamic scheduling and RACH resources in accordance with aspects of the present disclosure. The operations of method 1500 may be implemented by a UE 115 or its components as described herein. For example, the operations of method 1500 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1505, the UE may receive a message configuring resource allocation for at least a RACH preamble occasion and an uplink data occasion. The operations of 1505 may be performed according to the methods described herein. In some examples, aspects of the operations of 1505 may be performed by a message receiver as described with reference to FIGS. 7 through 10.

At 1510, the UE may determine if the RACH preamble occasion, the uplink data occasion, or both are restricted for cancellation based on the message. The operations of 1510 may be performed according to the methods described herein. In some examples, aspects of the operations of 1510 may be performed by a cancellation restriction determination component as described with reference to FIGS. 7 through 10.

At 1515, the UE may determine when to monitor a downlink control channel based on the determining if the RACH preamble occasion, the uplink data occasion, or both are restricted for cancellation. The operations of 1515 may be performed according to the methods described herein. In some examples, aspects of the operations of 1515 may be performed by a monitoring determination component as described with reference to FIGS. 7 through 10.

At 1520, the UE may transmit a RACH message in the RACH preamble occasion, the uplink data occasion, or both based on the determining when to monitor the downlink control channel. The operations of 1520 may be performed according to the methods described herein. In some examples, aspects of the operations of 1520 may be performed by a RACH message transmitter as described with reference to FIGS. 7 through 10.

Figure 16:
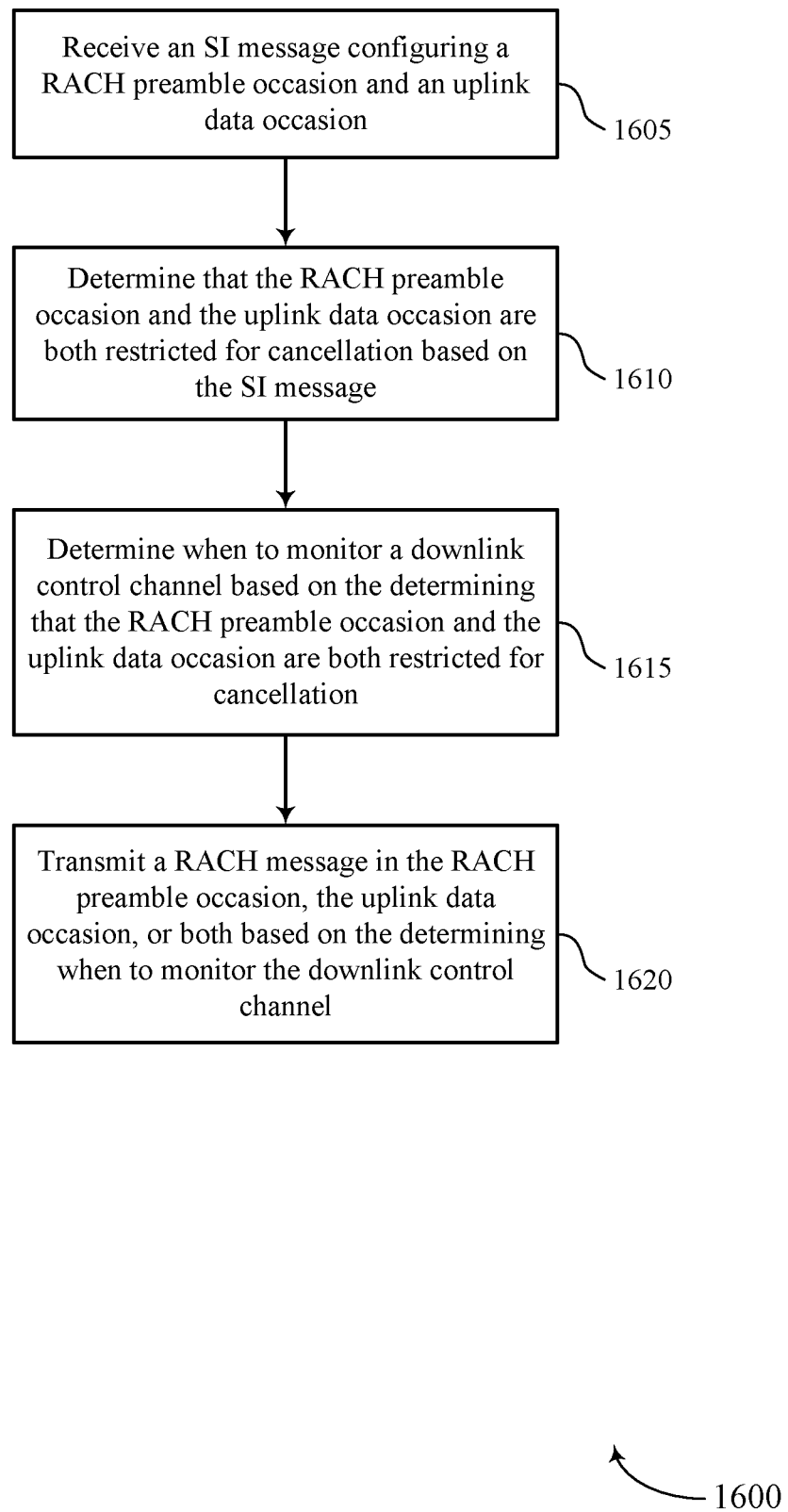

FIG. 16 shows a flowchart illustrating a method 1600 that supports handling conflicts between dynamic scheduling and RACH resources in accordance with aspects of the present disclosure. The operations of method 1600 may be implemented by a UE 115 or its components as described herein. For example, the operations of method 1600 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1605, the UE may receive an SI message configuring a RACH preamble occasion and an uplink data occasion. The operations of 1605 may be performed according to the methods described herein. In some examples, aspects of the operations of 1605 may be performed by a message receiver as described with reference to FIGS. 7 through 10.

At 1610, the UE may determine that the RACH preamble occasion and the uplink data occasion are both restricted for cancellation based on the SI message (e.g., based on the RACH preamble occasion and the uplink data occasion being configured by an SI message). The operations of 1610 may be performed according to the methods described herein. In some examples, aspects of the operations of 1610 may be performed by a cancellation restriction determination component as described with reference to FIGS. 7 through 10.

At 1615, the UE may determine when to monitor a downlink control channel based on the determining if the RACH preamble occasion, the uplink data occasion, or both are restricted for cancellation. For example, based on the RACH preamble occasion and the uplink data occasion both being restricted for cancellation, the UE may refrain from monitoring the downlink control channel for dynamic scheduling preempting the RACH preamble occasion and/or the uplink data occasion. The operations of 1615 may be performed according to the methods described herein. In some examples, aspects of the operations of 1615 may be performed by a monitoring determination component as described with reference to FIGS. 7 through 10.

At 1620, the UE may transmit a RACH message in the RACH preamble occasion, the uplink data occasion, or both based on the determining when to monitor the downlink control channel. The operations of 1620 may be performed according to the methods described herein. In some examples, aspects of the operations of 1620 may be performed by a random access message transmitter as described with reference to FIGS. 7 through 10.

Figure 17:
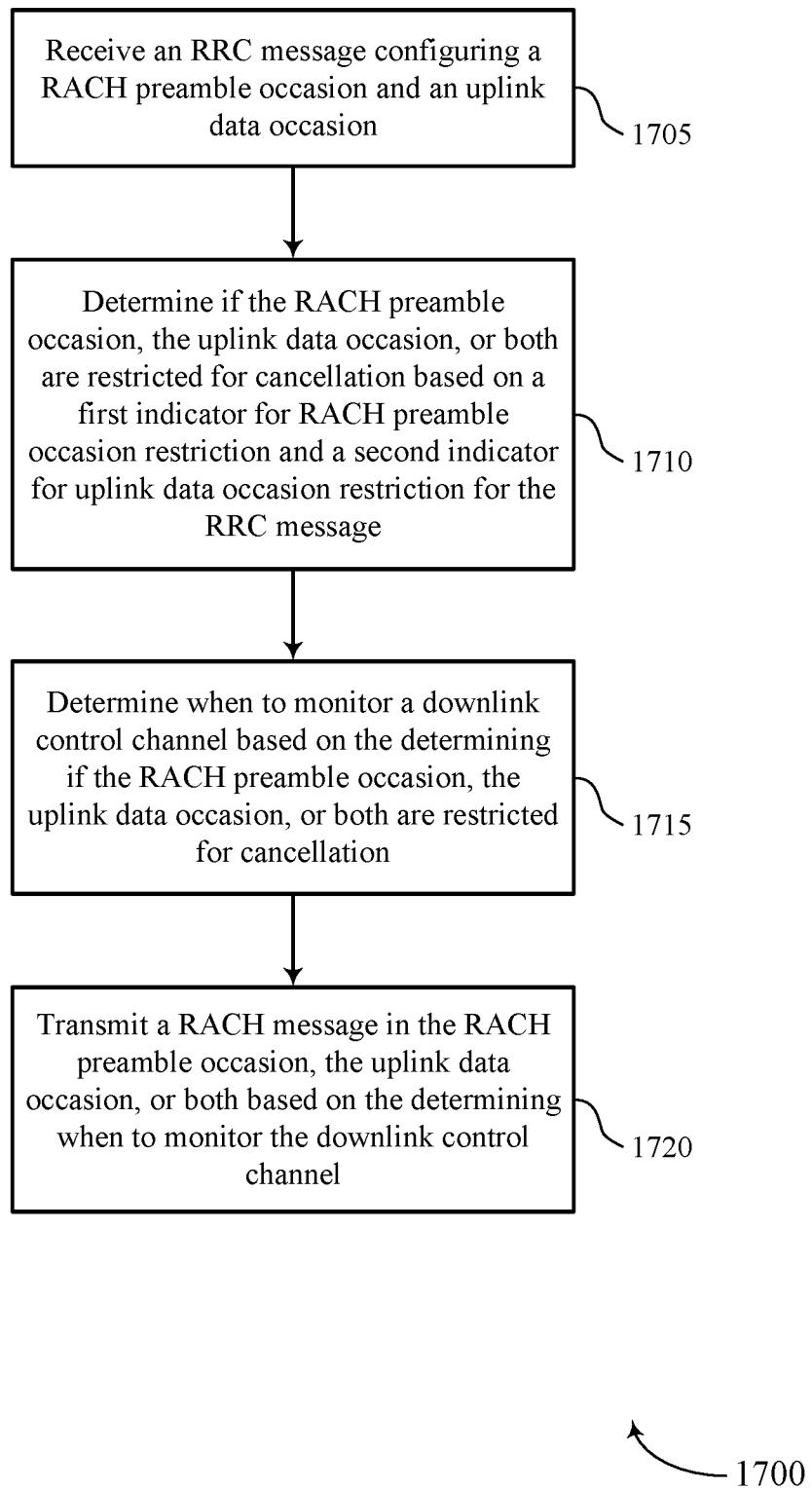

FIG. 17 shows a flowchart illustrating a method 1700 that supports handling conflicts between dynamic scheduling and RACH resources in accordance with aspects of the present disclosure. The operations of method 1700 may be implemented by a UE 115 or its components as described herein. For example, the operations of method 1700 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1705, the UE may receive an RRC message configuring a RACH preamble occasion and an uplink data occasion. The operations of 1705 may be performed according to the methods described herein. In some examples, aspects of the operations of 1705 may be performed by a message receiver as described with reference to FIGS. 7 through 10.

At 1710, the UE may determine if the RACH preamble occasion, the uplink data occasion, or both are restricted for cancellation based on a first indicator for RACH preamble occasion restriction and a second indicator for uplink data occasion restriction included in the RRC message. The operations of 1710 may be performed according to the methods described herein. In some examples, aspects of the operations of 1710 may be performed by a cancellation restriction determination component as described with reference to FIGS. 7 through 10.

At 1715, the UE may determine when to monitor a downlink control channel based on the determining if the RACH preamble occasion, the uplink data occasion, or both are restricted for cancellation. The operations of 1715 may be performed according to the methods described herein. In some examples, aspects of the operations of 1715 may be performed by a monitoring determination component as described with reference to FIGS. 7 through 10.

At 1720, the UE may transmit a RACH message in the RACH preamble occasion, the uplink data occasion, or both based on the determining when to monitor the downlink control channel. The operations of 1720 may be performed according to the methods described herein. In some examples, aspects of the operations of 1720 may be performed by a random access message transmitter as described with reference to FIGS. 7 through 10.

Figure 18:
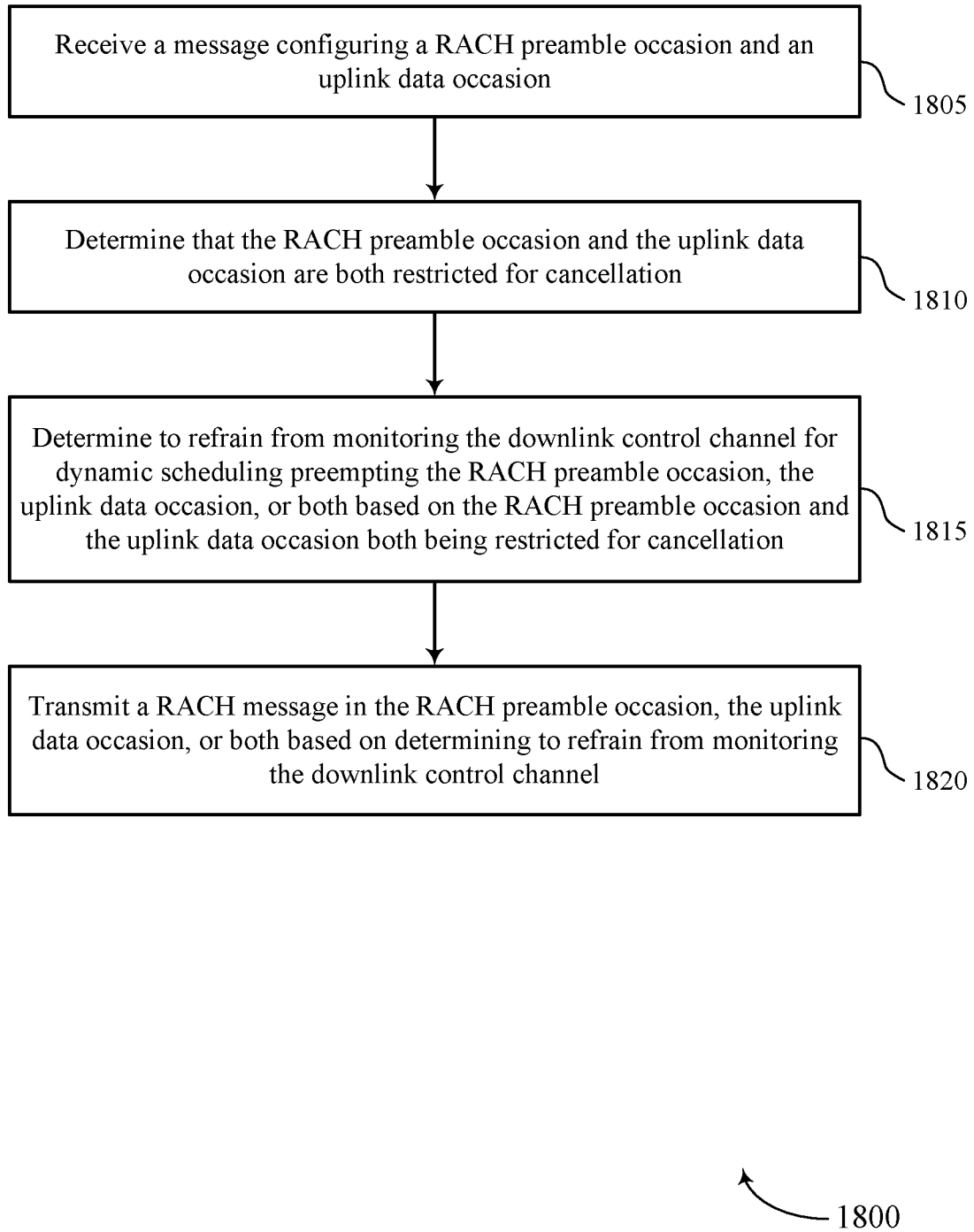

FIG. 18 shows a flowchart illustrating a method 1800 that supports handling conflicts between dynamic scheduling and RACH resources in accordance with aspects of the present disclosure. The operations of method 1800 may be implemented by a UE 115 or its components as described herein. For example, the operations of method 1800 may be performed by a communication manager as described with reference to FIGS. 7 through 10. In some examples, a UE may execute a set of instructions to control the functional elements of the UE to perform the described functions. Additionally or alternatively, a UE may perform aspects of the described functions using special-purpose hardware.

At 1805, the UE may receive a message configuring a RACH preamble occasion and an uplink data occasion. The operations of 1805 may be performed according to the methods described herein. In some examples, aspects of the operations of 1805 may be performed by a message receiver as described with reference to FIGS. 7 through 10.

At 1810, the UE may determine that the RACH preamble occasion and the uplink data occasion are both restricted for cancellation. The operations of 1810 may be performed according to the methods described herein. In some examples, aspects of the operations of 1810 may be performed by a cancellation restriction determination component as described with reference to FIGS. 7 through 10.

At 1815, the UE may determine to refrain from monitoring the downlink control channel for dynamic scheduling preempting the RACH preamble occasion, the uplink data occasion, or both based on the RACH preamble occasion and the uplink data occasion both being restricted for cancellation. The operations of 1815 may be performed according to the methods described herein. In some examples, aspects of the operations of 1815 may be performed by a monitoring determination component as described with reference to FIGS. 7 through 10.

At 1820, the UE may transmit a RACH message in the RACH preamble occasion, the uplink data occasion, or both based on the determining when to monitor the downlink control channel. For example, the UE may transmit the RACH message in the occasions based on refraining from monitoring for dynamic scheduling preempting the occasions. The operations of 1820 may be performed according to the methods described herein. In some examples, aspects of the operations of 1820 may be performed by a random access message transmitter as described with reference to FIGS. 7 through 10.

Figure 19:
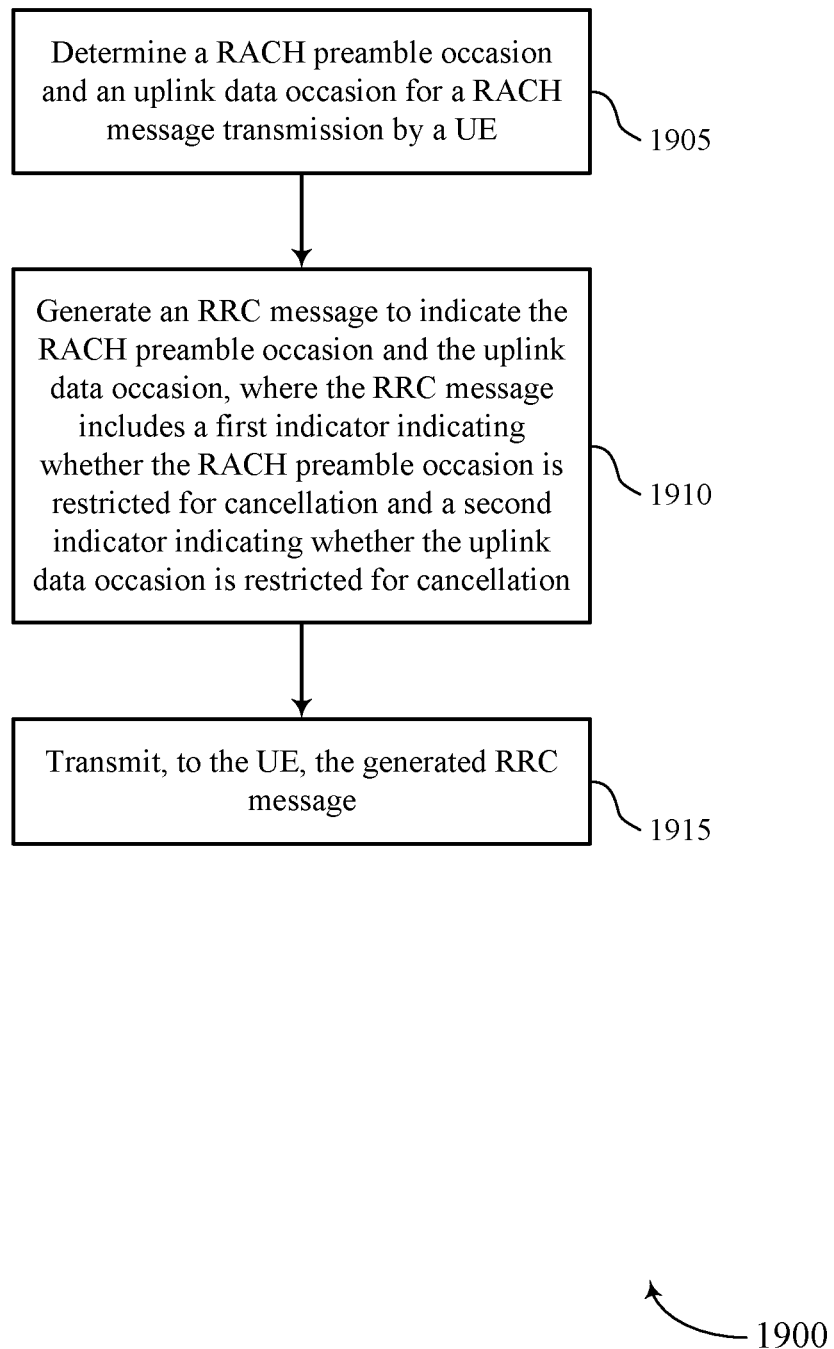

FIG. 19 shows a flowchart illustrating a method 1900 that supports handling conflicts between dynamic scheduling and RACH resources in accordance with aspects of the present disclosure. The operations of method 1900 may be implemented by a base station 105 or its components as described herein. For example, the operations of method 1900 may be performed by a communication manager as described with reference to FIGS. 11 through 14. In some examples, a base station may execute a set of instructions to control the functional elements of the base station to perform the described functions. Additionally or alternatively, a base station may perform aspects of the described functions using special-purpose hardware.

At 1905, the base station may determine a RACH preamble occasion and an uplink data occasion for a RACH message transmission by a UE. The operations of 1905 may be performed according to the methods described herein. In some examples, aspects of the operations of 1905 may be performed by an occasion determination component as described with reference to FIGS. 11 through 14.

At 1910, the base station may generate an RRC message to indicate the RACH preamble occasion and the uplink data occasion, where the RRC message includes a first indicator indicating whether the RACH preamble occasion is restricted for cancellation and a second indicator indicating whether the uplink data occasion is restricted for cancellation. The operations of 1910 may be performed according to the methods described herein. In some examples, aspects of the operations of 1910 may be performed by an RRC message generator as described with reference to FIGS. 11 through 14.

At 1915, the base station may transmit, to the UE, the generated RRC message. The operations of 1915 may be performed according to the methods described herein. In some examples, aspects of the operations of 1915 may be performed by an RRC message transmitter as described with reference to FIGS. 11 through 14.

Figure 20:
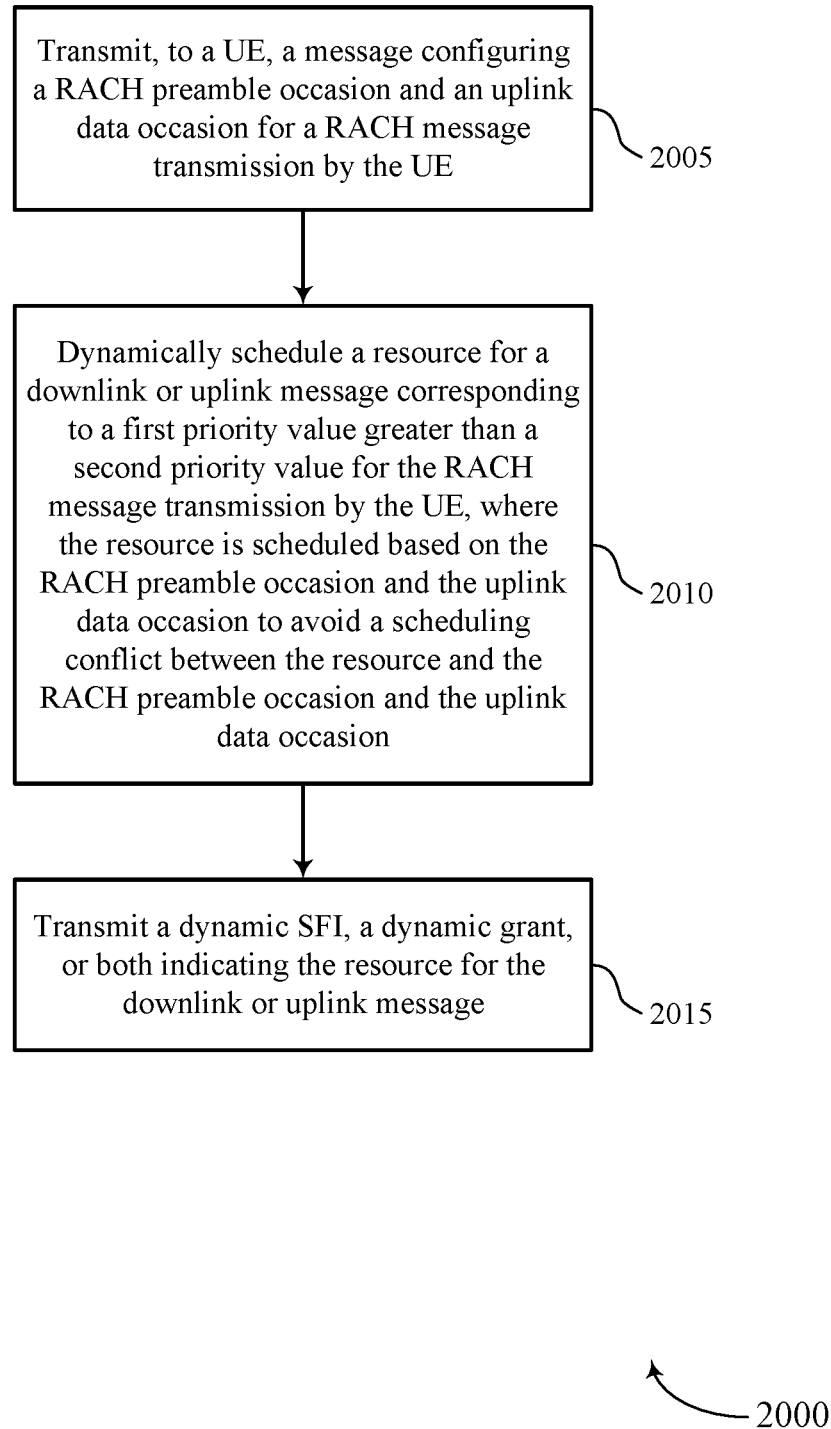

FIG. 20 shows a flowchart illustrating a method 2000 that supports handling conflicts between dynamic scheduling and RACH resources in accordance with aspects of the present disclosure. The operations of method 2000 may be implemented by a base station 105 or its components as described herein. For example, the operations of method 2000 may be performed by a communication manager as described with reference to FIGS. 11 through 14. In some examples, a base station may execute a set of instructions to control the functional elements of the base station to perform the described functions. Additionally or alternatively, a base station may perform aspects of the described functions using special-purpose hardware.

At 2005, the base station may transmit, to a UE, a message configuring a RACH preamble occasion and an uplink data occasion for a RACH message transmission by the UE. The operations of 2005 may be performed according to the methods described herein. In some examples, aspects of the operations of 2005 may be performed by an occasion configuration transmitter as described with reference to FIGS. 11 through 14.

At 2010, the base station may dynamically schedule a resource for a downlink or uplink message corresponding to a first priority value greater than a second priority value for the RACH message transmission by the UE, where the resource is scheduled based on the RACH preamble occasion and the uplink data occasion to avoid a scheduling conflict between the resource and the RACH preamble occasion and the uplink data occasion. The operations of 2010 may be performed according to the methods described herein. In some examples, aspects of the operations of 2010 may be performed by a scheduling component as described with reference to FIGS. 11 through 14.

At 2015, the base station may transmit a dynamic SFI, a dynamic grant, or both indicating the resource for the downlink or uplink message. The operations of 2015 may be performed according to the methods described herein. In some examples, aspects of the operations of 2015 may be performed by a dynamic scheduling transmitter as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a message configuring a resource allocation for at least a random access preamble occasion and an uplink data occasion;
   determining if the random access preamble occasion, the uplink data occasion, or both are restricted for cancellation based at least in part on the message;
   determining when to monitor a downlink control channel based at least in part on the determining if the random access preamble occasion, the uplink data occasion, or both are restricted for cancellation; and
   transmitting a random access message in the random access preamble occasion, the uplink data occasion, or both based at least in part on the determining when to monitor the downlink control channel.

2. The method of claim 1, wherein:
   the message comprises a system information message; and
   the message configures the resource allocation for contention-based random access.

3. The method of claim 2, wherein determining if the random access preamble occasion, the uplink data occasion, or both are restricted for cancellation comprises:
   determining that the random access preamble occasion and the uplink data occasion are both restricted for cancellation based at least in part on the system information message.

4. The method of claim 1, wherein:
   the message comprises a radio resource control message; and
   the message configures the resource allocation for contention-free random access.

5. The method of claim 4, wherein determining if the random access preamble occasion, the uplink data occasion, or both are restricted for cancellation comprises:
   determining if the random access preamble occasion, the uplink data occasion, or both are restricted for cancellation based at least in part on a first indicator for random access preamble occasion restriction and a second indicator for uplink data occasion restriction for the radio resource control message.

6. The method of claim 5, wherein the first indicator, the second indicator, or both comprise one-bit or multi-bit flags.

7. The method of claim 1, wherein the transmitting comprises:
   transmitting, in the random access preamble occasion, a random access preamble message; and
   refraining from transmitting, in the uplink data occasion, an uplink data message based at least in part on the determining if the random access preamble occasion, the uplink data occasion, or both are restricted for cancellation.

8. The method of claim 1, wherein:
   the determining if the random access preamble occasion, the uplink data occasion, or both are restricted for cancellation comprises determining that the random access preamble occasion and the uplink data occasion are both restricted for cancellation; and
   the determining when to monitor the downlink control channel comprises determining to refrain from monitoring the downlink control channel for dynamic scheduling preempting the random access preamble occasion, the uplink data occasion, or both based at least in part on the random access preamble occasion and the uplink data occasion both being restricted for cancellation.

9. The method of claim 1, wherein:
   the determining if the random access preamble occasion, the uplink data occasion, or both are restricted for cancellation comprises determining that the random access preamble occasion is restricted for cancellation; and
   the transmitting comprises transmitting, in the random access preamble occasion, a random access message one (Msg1) in a four-step random access procedure, wherein the determining when to monitor the downlink control channel comprises determining to refrain from monitoring the downlink control channel for dynamic scheduling preempting the random access preamble occasion, the uplink data occasion, or both based at least in part on the random access preamble occasion being restricted for cancellation and the transmitting the random access Msg1.

10. The method of claim 1, wherein:
    the determining if the random access preamble occasion, the uplink data occasion, or both are restricted for cancellation comprises determining that the random access preamble occasion is restricted for cancellation and the uplink data occasion is non-restricted for cancellation; and
    the determining when to monitor the downlink control channel comprises determining to monitor the downlink control channel for dynamic scheduling preempting the uplink data occasion based at least in part on the uplink data occasion being non-restricted for cancellation.

11. The method of claim 10, further comprising:
    monitoring the downlink control channel for the dynamic scheduling of a dynamic slot format indication, a dynamic grant, or both preempting the uplink data occasion, wherein the downlink control channel corresponds to a common search space or a UE-specific search space and the transmitting is based at least in part on the monitoring.

12. The method of claim 11, wherein the downlink control channel is monitored up to a threshold time preceding the uplink data occasion by a dynamic scheduling processing threshold duration, and wherein the dynamic scheduling processing threshold duration is based at least in part on one or more UE capabilities, a frequency band of operation, a numerology of an active bandwidth part for downlink, uplink, or both, whether a bandwidth part switch is involved, or a combination thereof.

13. The method of claim 1, wherein:
the determining if the random access preamble occasion, the uplink data occasion, or both are restricted for cancellation comprises determining that the random access preamble occasion is non-restricted for cancellation; and
the determining when to monitor the downlink control channel comprises determining to monitor the downlink control channel for dynamic scheduling preempting the random access preamble occasion, the uplink data occasion, or both based at least in part on the random access preamble occasion being non-restricted for cancellation.

14. The method of claim 13, further comprising:
monitoring the downlink control channel for the dynamic scheduling of a dynamic slot format indication, a dynamic grant, or both preempting the random access preamble occasion, the uplink data occasion, or both, wherein the downlink control channel corresponds to a common search space or a UE-specific search space and the transmitting is based at least in part on the monitoring.

15. The method of claim 14, wherein the downlink control channel is monitored up to a threshold time preceding the random access preamble occasion by a dynamic scheduling processing threshold duration, and wherein the dynamic scheduling processing threshold duration is based at least in part on one or more UE capabilities, a frequency band of operation, a numerology of an active bandwidth part for downlink, uplink, or both, whether a bandwidth part switch is involved, or a combination thereof.

16. The method of claim 1, wherein receiving the message configuring the random access preamble occasion and the uplink data occasion comprises:
receiving a system information message, a radio resource control message, or both configuring a plurality of random access preamble occasions and a plurality of uplink data occasions for a configuration period.

17. The method of claim 16, further comprising:
selecting the random access preamble occasion from the plurality of random access preamble occasions and the uplink data occasion from the plurality of uplink data occasions.

18. The method of claim 16, further comprising:
selecting a plurality of random access preamble occasion and uplink data occasion candidate pairs from the plurality of random access preamble occasions and the plurality of uplink data occasions;
identifying dynamic scheduling preempting a respective random access preamble occasion, a respective uplink data occasion, or both for a subset of the plurality of random access preamble occasion and uplink data occasion candidate pairs; and
removing the subset of the plurality of random access preamble occasion and uplink data occasion candidate pairs from the plurality of random access preamble occasion and uplink data occasion candidate pairs, wherein the random access message is transmitted in the random access preamble occasion, the uplink data occasion, or both for a random access preamble occasion and uplink data occasion candidate pair remaining in the plurality of random access preamble occasion and uplink data occasion candidate pairs following the removing.

19. The method of claim 18, wherein the selecting is based at least in part on one or more reference signal received power measurements, one or more link level qualities, one or more UE capabilities, or a combination thereof.

20. The method of claim 1, further comprising:
receiving a configuration message indicating a plurality of random access occasion configurations, wherein each random access occasion configuration of the plurality of random access occasion configurations corresponds to a capability of the UE to handle dynamic scheduling; and
selecting a random access occasion configuration of the plurality of random access occasion configurations based at least in part on the capability of the UE to handle the dynamic scheduling, wherein the message is received based at least in part on the selected random access occasion configuration.

21. A method for wireless communications at a base station, comprising:
determining a random access preamble occasion and an uplink data occasion for a random access message transmission by a user equipment (UE);
generating a radio resource control message to indicate the random access preamble occasion and the uplink data occasion, wherein the radio resource control message comprises a first indicator indicating whether the random access preamble occasion is restricted for cancellation and a second indicator indicating whether the uplink data occasion is restricted for cancellation; and
transmitting, to the UE, the generated radio resource control message.

22. The method of claim 21, wherein the second indicator indicates that the uplink data occasion is non-restricted for cancellation, the method further comprising:
dynamically scheduling a resource for a downlink or uplink message corresponding to a first priority value greater than a second priority value for the random access message transmission by the UE, wherein the resource preempts the uplink data occasion; and
transmitting a dynamic slot format indication, a dynamic grant, or both indicating the resource for the downlink or uplink message.

23. The method of claim 22, further comprising:
receiving, from the UE, a random access preamble in the random access preamble occasion based at least in part on the generated radio resource control message.

24. An apparatus for wireless communications at a user equipment (UE), comprising:
a processor;
memory in electronic communication with the processor; and
instructions stored in the memory and executable by the processor to cause the apparatus to:
receive a message configuring a resource allocation for at least a random access preamble occasion and an uplink data occasion;
determine if the random access preamble occasion, the uplink data occasion, or both are restricted for cancellation based at least in part on the message;
determine when to monitor a downlink control channel based at least in part on the determining if the random access preamble occasion, the uplink data occasion, or both are restricted for cancellation; and transmit a random access message in the random access preamble occasion, the uplink data occasion, or both based at least in part on the determining when to monitor the downlink control channel.

25. The apparatus of claim 24, wherein:

the message comprises a system information message; and the message configures the resource allocation for contention-based random access.

26. The apparatus of claim 25, wherein instructions to determine if the random access preamble occasion, the uplink data occasion, or both are restricted for cancellation are further executable by the processor to cause the apparatus to:

determine that the random access preamble occasion and the uplink data occasion are both restricted for cancellation based at least in part on the system information message.

27. The apparatus of claim 24, wherein:

the message comprises a radio resource control message; and the message configures the resource allocation for contention-free random access.

28. The apparatus of claim 27, wherein the instructions to determine if the random access preamble occasion, the uplink data occasion, or both are restricted for cancellation are further executable by the processor to cause the apparatus to:

determine if the random access preamble occasion, the uplink data occasion, or both are restricted for cancellation based at least in part on a first indicator for random access preamble occasion restriction and a second indicator for uplink data occasion restriction for the radio resource control message.

29. The apparatus of claim 24, wherein the instructions to transmit are further executable by the processor to causes the apparatus to:

transmit, in the random access preamble occasion, a random access preamble message; and refrain from transmitting, in the uplink data occasion, an uplink data message based at least in part on the determining if the random access preamble occasion, the uplink data occasion, or both are restricted for cancellation.

30. An apparatus for wireless communications at a base station, comprising:

a processor;

memory in electronic communication with the processor; and instructions stored in the memory and executable by the processor to cause the apparatus to:

determine a random access preamble occasion and an uplink data occasion for a random access message transmission by a user equipment (UE);

generate a radio resource control message to indicate the random access preamble occasion and the uplink data occasion, wherein the radio resource control message comprises a first indicator indicating whether the random access preamble occasion is restricted for cancellation and a second indicator indicating whether the uplink data occasion is restricted for cancellation; and transmit, to the UE, the generated radio resource control message.

* * * * *